(12) United States Patent
Vanstone et al.

(10) Patent No.: US 8,397,294 B2
(45) Date of Patent: Mar. 12, 2013

(54) APPARATUS, SYSTEM AND METHOD FOR PREVENTING DATA LOSS

(75) Inventors: Scott Alexander Vanstone, Campbellville (CA); Neil Patrick Adams, Kitchener (CA)

(73) Assignees: Research In Motion Limited, Waterloo, Ontario (CA); Certicom Corp., Mississauga, Ontario (CA)

( * ) Notice: Subject to any disclaimer, the term of this patent is extended or adjusted under 35 U.S.C. 154(b) by 114 days.

(21) Appl. No.: 12/956,296

(22) Filed: Nov. 30, 2010

(65) Prior Publication Data

US 2012/0137368 A1 May 31, 2012

(51) Int. Cl.
*H04L 29/06* (2006.01)
(52) U.S. Cl. .......................................... 726/22
(58) Field of Classification Search .............. 726/26, 726/27, 22, 23
See application file for complete search history.

(56) References Cited

U.S. PATENT DOCUMENTS

| | | | | |
|---|---|---|---|---|
| 7,761,912 | B2 * | 7/2010 | Yee et al. | 726/11 |
| 2006/0070126 | A1 | 3/2006 | Grynberg | |
| 2008/0172382 | A1 | 7/2008 | Prettejohn | |
| 2008/0313732 | A1 * | 12/2008 | Pierce | 726/22 |
| 2010/0175136 | A1 | 7/2010 | Frumer et al. | |

FOREIGN PATENT DOCUMENTS

| | | |
|---|---|---|
| CA | 2759716 | 5/2012 |
| EP | 2458521 | 5/2012 |
| GB | 2461422 A | 7/2010 |

OTHER PUBLICATIONS

Extended European Search Report dated Mar. 31, 2011 from EP10193101.2.
Response. European Patent Application No. 10193101.2. Dated: Mar. 9, 2012.
Exam Report. European Patent Application No. 10193101.2. Dated: Nov. 9, 2011.
Response. European Patent Application No. 10193101.2. Dated: Aug. 31, 2011.
McGrath et al. "Which Browser Warning Notification?", 2006, Harvard University, Cambridge. Available at http://www.eecs.harvard.edu/~prash/papers/cs279r/cs279r-paper.pdf.
McGrath et al. "Which Browser Warning Notification?", 2006, Harvard University, Cambridge. Available at http://www.eecs.harvard.edu/~prash/papers/cs279r/cs279r-appendix.pdf.

(Continued)

*Primary Examiner* — Ali Abyaneh
(74) *Attorney, Agent, or Firm* — Bereskin & Parr LLP/S.E.N.C.R.L., s.r.l.

(57) ABSTRACT

A device and method are provided for a device that communicates security information to a user entering content into the device. In an aspect, the device may access content from a server over a connection through the network. The device displays the content on a user interface of the device. The device detects information entered into a field of the displayed content and evaluates a security state of the device. If the security state is below a security threshold and, if the entered information is identified as protected information based on stored criteria, the device displaying a visual indication on the user interface.

16 Claims, 13 Drawing Sheets

OTHER PUBLICATIONS

McGrath et al. "Browser Warning Notification", 2006, Harvard University, Cambridge. Available at http://eecs.harvard.edu/~prash/papers/cs279r/cs279r-slides.ppt.

"Handypassword home Jan. 2008.pdf" Password Manager—Available at: http://web.archive.org/web/*/http://handypassword.com; eg Jan. 10, 2008.

"Handypassword version history Jan. 2008.pdf" Password Manager Available at: http://web.archive.org/web/*/http://handypassword.com; eg Jan. 10, 2008—version history.

Microsoft TechNet Internet Explorer 6 (eg appendix—app IE6.pdf) Available at: http://technet.microsoft.com/en-us/library/dd361873.aspx.

* cited by examiner

PRIOR ART FIG. 6

APPARATUS, SYSTEM AND METHOD FOR PREVENTING DATA LOSS

BACKGROUND

This application relates to on-line communications. In particular, it relates to a device, system and method for preventing data loss during on-line communications.

Secure on-line communications rely upon two communicating device to agree upon a security protocol, exchange and validate security certificates to authenticate at least one of the devices, and exchange encryption keys to establish a secure connection between the devices. The level of security for a particular secure connection can vary, depending for instance upon the level of security protocol agreed upon, the type of certificate authentication used by the device along with other factors.

Currently, when a user is accessing an on-line resource over a secure connection the state of the connection is identified by a small visual indication, typically a padlock, presented in the lower right portion of a browser window and the suffix "s" to the usual "http" address prefix to identify a secure website connection as "https".

The indications help show that a secure connection has been established, but do not indicate a level of security of the connection. Furthermore, the indications are presented in an unobtrusive manner that may be missed by a user. Finally, the indications are presented when a user directs their browser to an on-line resource that requires a secure connection. The user's browser reacts to the requirements of the on-line resource, but does not itself act in a positive manner to protect a user's information.

It would be advantageous for a device, system or method to alleviate some of the current problems relating to on-line communications.

BRIEF DESCRIPTION OF THE DRAWINGS

In drawings which illustrate by way of example only embodiments of the present application.

DETAILED DESCRIPTION

Figure 1:
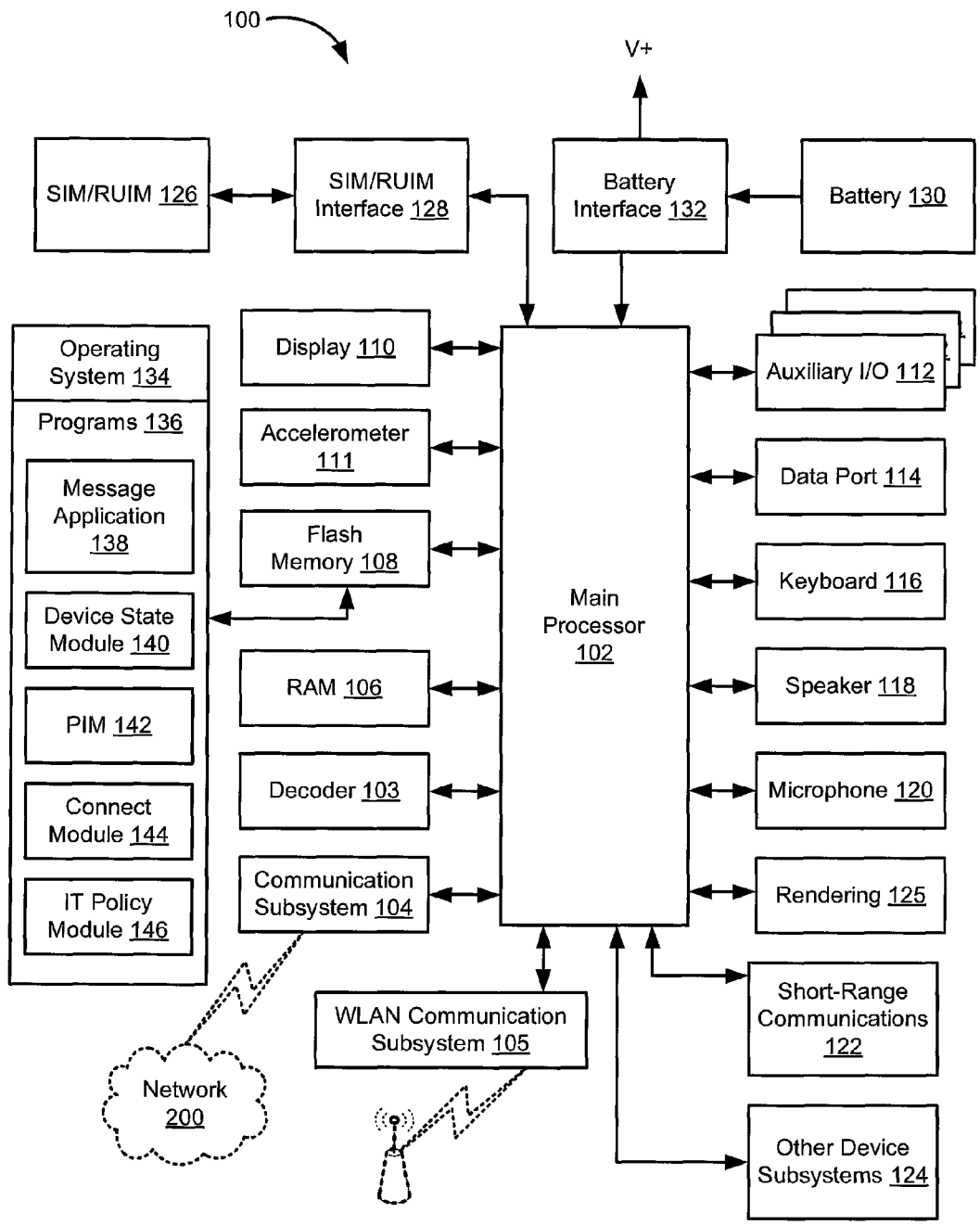
FIG. 1 is a block diagram of an embodiment of a mobile device.

In an embodiment, a method is provided for a computer processing device communicating security information, the method comprising: the computing device detecting content entered into a user input interface of the computing device; the computing device evaluating a security state of the computing device and identifying the entered content as protected information based on criteria stored in one or more data stores accessible to the computing device; and, the computing device displaying a visual indication on a user display interface if the security state is below the security threshold and the entered content is identified as protected information.

In an aspect of the method, the computing device may receive on-line content from a server over a connection through a network and the computing device displays the content on the user display interface, the displayed content including content entry fields to receive the entered information, the computing device detecting the entered content by processing the displayed content based on the stored criteria to identify the content entered into the content entry fields as protected information.

In an aspect of the method, the visual indication may comprise at least one of highlighting a content entry field containing the identified protected information or displaying a notice that the entered information comprises protected information and the security state is below the security threshold.

In an aspect of the method, the notice may further comprise one or more user selectable options, to allow access to the protected content.

In an aspect of the method, the device may enter a protected mode when the security state is below the security threshold and the protected information has been identified, the protected mode prohibiting transmission of the protected information from the computing device.

In an aspect of the method the protected information may be identified by the computing device performing at least one of the following operations: matching the entered content with the criteria; matching a content entry field identifier of the content entry field with the criteria; or, matching characteristics of the form of the entered content with the criteria.

In an aspect of the method, the security threshold may comprise a minimum level of connection security between the computing device and a server connected to the computing device over a network.

In an aspect of the method, at least one of the security threshold, the one or more data stores or the criteria may be set by instructions received by the computing device from a host server connected to the computing device over a network.

In an aspect of the method, the computing device may evaluate the security state of the device by determining whether an application in operation on the computing device to receive the entered content is trusted or untrusted.

In an embodiment, a computer program product may be provided comprising non-transitory memory containing instructions for execution by a processor of a computing device to render the computing device operative to perform the method.

In an embodiment, a computing device may be provided for communicating security information, the computing device may be operative to: detect content entered into a user input interface of the computing device; evaluate a security state of the computing device and identify the entered content as protected information based on criteria stored in one or more data stores accessible by the computing device; and, display a visual indication on a display interface of the computing device if the security state is below a security threshold and the entered content is identified as protected information.

In an aspect, the computing device may be connected to a network and the computing device may be further operative to detect the entered content by the device being operative to: receive on-line content from a server over the connection; display the received content on the display interface, the displayed content including content entry fields to receive the entered information; and, process the displayed content based on the stored criteria to identify the entered information as protected information.

In an aspect, the visual indication may comprise at least one of the content entry field highlighted on the user interface or a notice that the entered content comprises protected information and the security state is below the security threshold.

In an aspect, the notice may further comprise one or more user selectable options for selection by a user, the computing device further operative to require selection of the user selectable options to allow access to the displayed content.

In an aspect, the computing device may be operative to enter a protected mode when the security state is below the security threshold, the protected mode rendering the computing device inoperative to transmit the entered content from the computing device.

In an aspect, the computing device may be operative to identify protected information by matching at least one of the following operations: match the entered content with the criteria; match a content entry field identifier of the content entry field with the criteria; or, match characteristics of the form of data entered by the user into the content entry field with the criteria.

In an aspect, the computing device may be operative to connect to a server over a network and wherein the security threshold comprises a pre-selected security threshold specifying a minimum level of connection security of the connection between the computing device and the server.

In an aspect, the computing device may be operative to receive instructions to set the security threshold, the criteria or the one or more data stores to be compared, from a host server connected to the computing device over a network.

In an aspect, the computing device may be operative to evaluate the security state of the device by determining whether an application in operation on the computing device to receive the entered content is trusted or untrusted.

Figure 2:
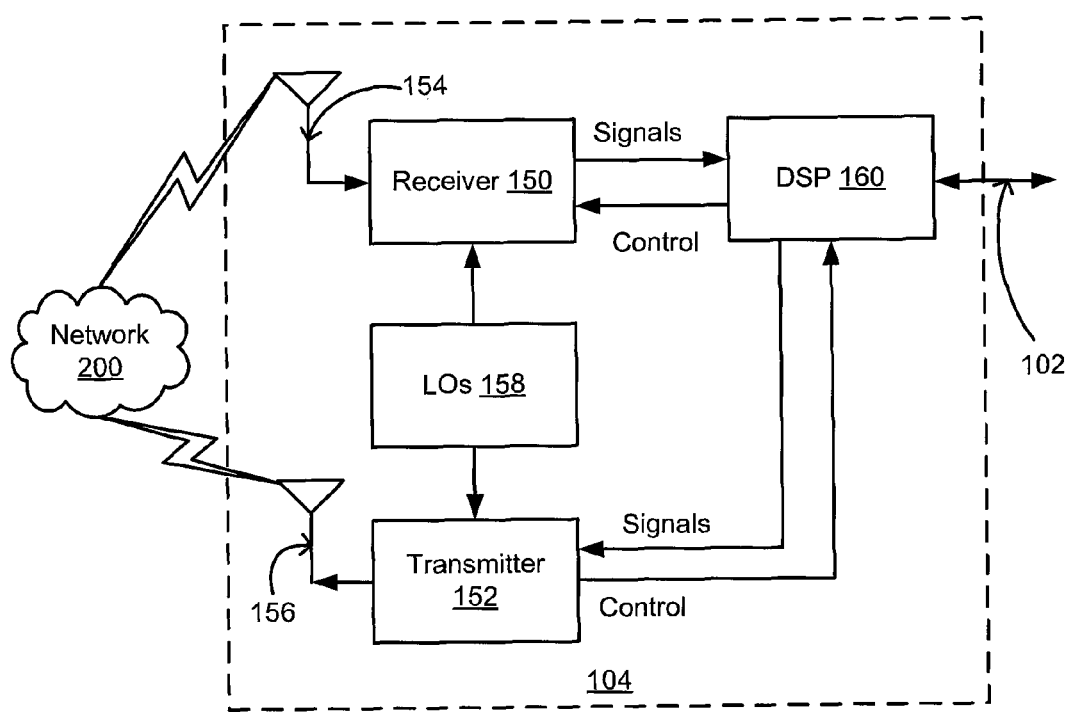
FIG. 2 is a block diagram of an embodiment of a communication subsystem component of the mobile device of FIG. 1.
Figure 3:
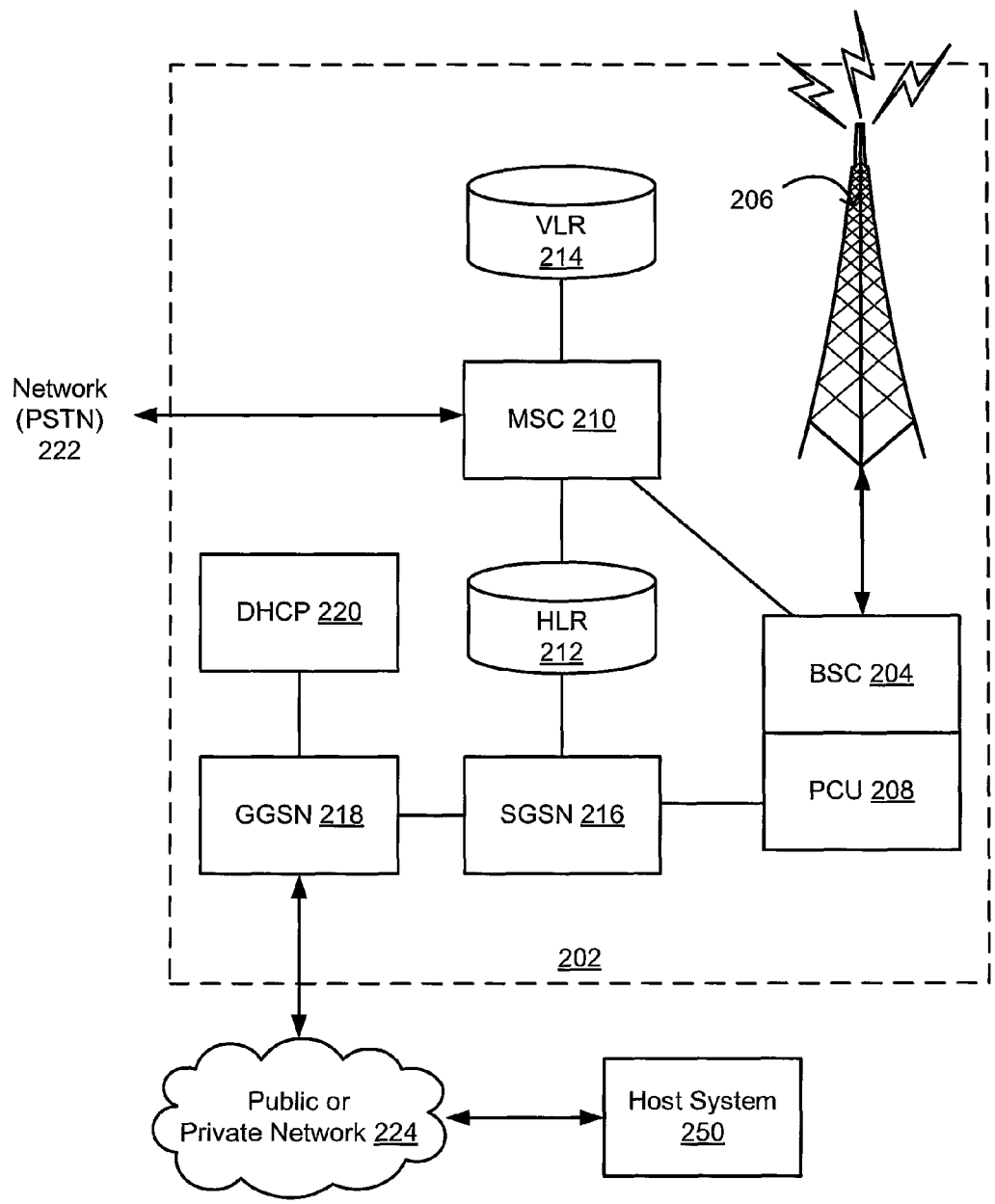
FIG. 3 is an exemplary block diagram of a node of a wireless network for use with the mobile device of FIG. 1.
Figure 4:
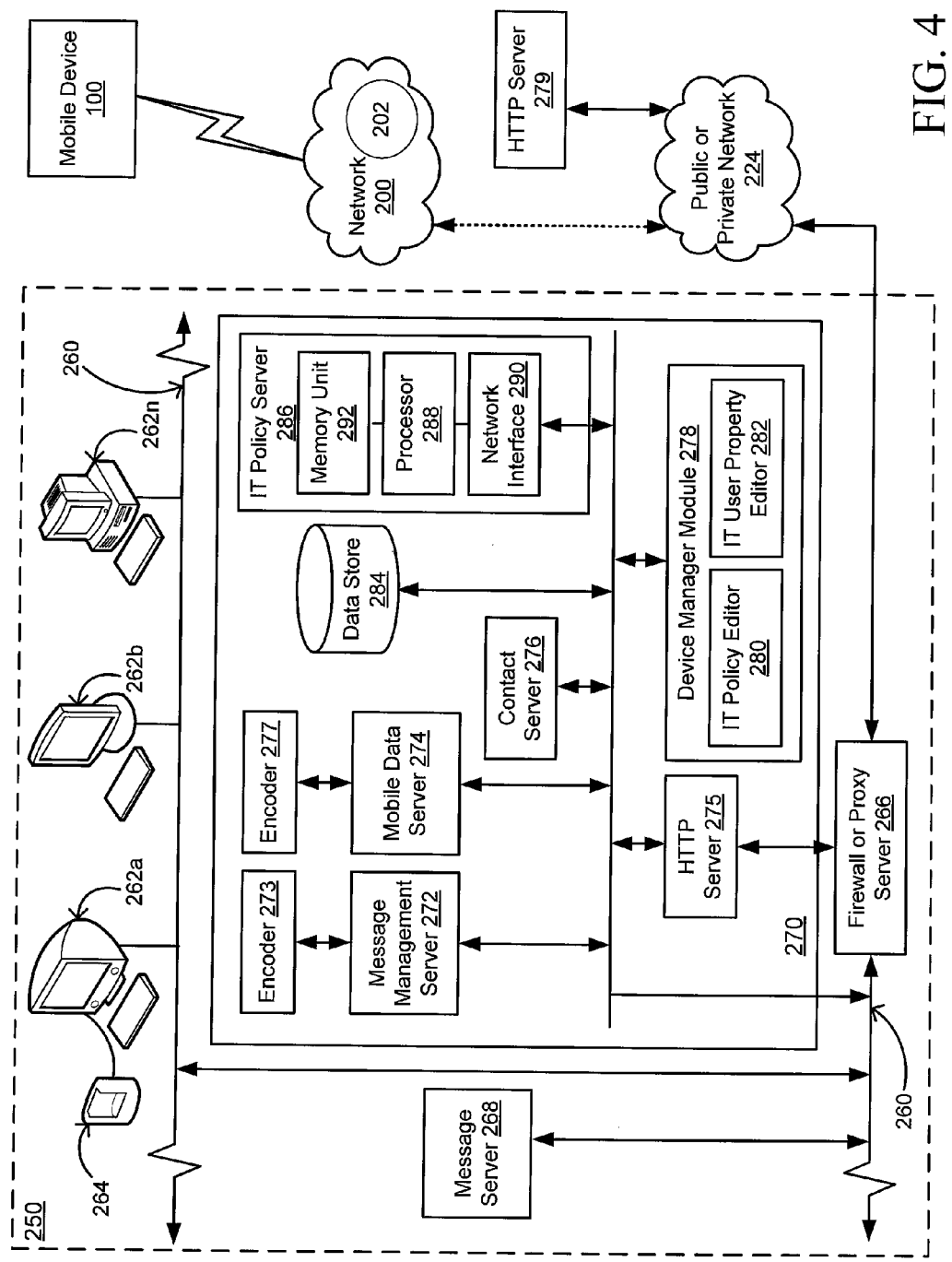
FIG. 4 is a block diagram illustrating components of a host system in one exemplary configuration for use with the wireless network of FIG. 3 and the mobile device of FIG. 1.

The embodiments described herein may be implemented on a communication device such as that illustrated in FIGS. 1 and 2. The communication device may communicate with other devices over a wireless communication system or enterprise system as illustrated in FIGS. 3 and 4. The communication device 100 may be a mobile device with two-way communication and advanced data communication capabilities including the capability to communicate with other mobile devices or computer systems through a network of transceiver stations. The communication device 100 can also have voice communication capabilities.

FIG. 1 is a block diagram of an exemplary embodiment of a communication device 100. The communication device 100 includes a number of components such as a main processor 102 that controls the overall operation of the communication device 100. Communication functions, including data and voice communications, are performed through a communication subsystem 104. Data received by the communication device 100 can be decompressed and decrypted by decoder 103, operating according to any suitable decompression techniques, and encryption/decryption techniques according to various standards, such as Data Encryption Standard (DES), Triple DES, or Advanced Encryption Standard (AES)). Image data is typically compressed and decompressed in accordance with appropriate standards, such as JPEG, while video data is typically compressed and decompressed in accordance with appropriate standards, such as H.26x and MPEG-x series standards.

The communication subsystem 104 receives messages from and sends messages to a wireless network 200. In this exemplary embodiment of the communication device 100, the communication subsystem 104 is configured in accordance with one or more of Global System for Mobile Communication (GSM), General Packet Radio Services (GPRS) standards, Enhanced Data GSM Environment (EDGE) and Universal Mobile Telecommunications Service (UMTS). New standards are still being defined, but it is believed that they will have similarities to the network behavior described herein, and it will also be understood by persons skilled in the art that the embodiments described herein are intended to use any other suitable standards that are developed in the future. The wireless link connecting the communication subsystem 104 with the wireless network 200 represents one or more different Radio Frequency (RF) channels, operating according to defined protocols specified for GSM, GPRS, EDGE, or UMTS, and optionally other network communications. With newer network protocols, these channels are capable of supporting both circuit switched voice communications and packet switched data communications.

Other wireless networks can also be associated with the communication device 100 in variant implementations. The different types of wireless networks that can be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks, third-generation (3G) networks like EDGE, HSPA, HSPA+, EVDO and UMTS, or fourth-generation (4G) networks such as LTE and LTE Advanced. Some other examples of data-centric networks include WiFi 802.11™, Mobitex™ and DataTAC™ network communication systems. Examples of other voice-centric data networks include Personal Communication Systems (PCS) networks like GSM and Time Division Multiple Access (TDMA) systems. The mobile device 100 may be provided with additional communication subsystems, such as the wireless LAN (WLAN) communication subsystem 105 also shown in FIG. 1. The WLAN communication subsystem may operate in accordance with a known network protocol such as one or more of the 802.11™ family of standards developed by IEEE. The communication subsystem 105 may be separate from, or integrated with, the communication subsystem 104 or with the short-range communications module 122. The main processor 102 also interacts with additional subsystems such as a Random Access Memory (RAM) 106, a flash memory 108, a display 110, an auxiliary input/output (I/O) subsystem 112, a data port 114, a keyboard 116, a speaker 118, a microphone 120, the short-range communications 122 and other device subsystems 124. The communication device may also be provided with an accelerometer 111, which may be used to detect gravity- or motion-induced forces and their direction. Detection of such forces applied to the device 100 may be processed to determine a response of the device 100, such as an orientation of a graphical user interface displayed on the display assembly 110 in response to a determination of the current orientation of which the device 100.

Some of the subsystems of the communication device 100 perform communication-related functions, whereas other subsystems can provide "resident" or on-device functions. By way of example, the display 110 and the keyboard 116 can be used for both communication-related functions, such as entering a text message for transmission over the network 200, and device-resident functions such as a calculator or task list.

A rendering circuit 125 is included in the device 100. When a user specifies that a data file is to be viewed on the display 110, the rendering circuit 125 analyzes and processes the data file for visualization on the display 110. Rendering data files originally optimized or prepared for visualization on large-screen displays on a portable electronic device display often requires additional processing prior to visualization on the small-screen portable electronic device displays. This additional processing may be accomplished by the rendering engine 125. As will be appreciated by those of skill in the art, the rendering engine can be implemented in hardware, software, or a combination thereof, and can comprise a dedicated image processor and associated circuitry, or can be implemented within main processor 102.

The communication device 100 can send and receive communication signals over the wireless network 200 after required network registration or activation procedures have been completed. Network access is associated with a subscriber or user of the communication device 100. To identify a subscriber, the communication device 100 requires a SIM/RUIM card 126 (i.e. Subscriber Identity Module or a Removable User Identity Module) or another suitable identity module to be inserted into a SIM/RUIM interface 128 in order to communicate with a network. The SIM/RUIM card 126 is one type of a conventional "smart card" that can be used to identify a subscriber of the communication device 100 and to personalize the communication device 100, among other things. Without the SIM/RUIM card 126, the communication device 100 is not fully operational for communication with the wireless network 200. By inserting the SIM/RUIM card 126 into the SIM/RUIM interface 128, a subscriber can access all subscribed services. Services can include: web browsing and messaging such as e-mail, voice mail, Short Message Service (SMS), and Multimedia Messaging Services (MMS). More advanced services can include: point of sale, field service and sales force automation. The SIM/RUIM card 126 includes a processor and memory for storing information. Once the SIM/RUIM card 126 is inserted into the SIM/RUIM interface 128, it is coupled to the main processor 102. In order to identify the subscriber, the SIM/RUIM card 126 can include some user parameters such as an International Mobile Subscriber Identity (IMSI). An advantage of using the SIM/RUIM card 126 is that a subscriber is not necessarily bound by any single physical mobile device. The SIM/RUIM card 126 can store additional subscriber information for a mobile device as well, including datebook (or calendar) information and recent call information. Alternatively, user identification information can also be programmed into the flash memory 108.

The communication device 100 may be a battery-powered device including a battery interface 132 for receiving one or more rechargeable batteries 130. In at least some embodiments, the battery 130 can be a smart battery with an embedded microprocessor. The battery interface 132 is coupled to a regulator (not shown), which assists the battery 130 in providing power V+ to the communication device 100. Although current technology makes use of a battery, future technologies such as micro fuel cells can provide the power to the communication device 100.

The communication device 100 also includes an operating system 134 and software components 136 to 146 which are described in more detail below. The operating system 134 and the software components 136 to 146 that are executed by the main processor 102 are typically stored in a persistent store such as the flash memory 108, which can alternatively be a read-only memory (ROM) or similar storage element (not shown). Those skilled in the art will appreciate that portions of the operating system 134 and the software components 136 to 146, such as specific device applications, or parts thereof, can be temporarily loaded into a volatile store such as the RAM 106. Other software components can also be included, as is well known to those skilled in the art.

The subset of software applications 136 that control basic device operations, including data and voice communication applications, will normally be installed on the communication device 100 during its manufacture. Other software applications include a message application 138 that can be any suitable software program that allows a user of the communication device 100 to send and receive electronic messages. Various alternatives exist for the message application 138 as is well known to those skilled in the art. Messages that have been sent or received by the user are typically stored in the flash memory 108 of the communication device 100 or some other suitable storage element in the communication device 100. In at least some embodiments, some of the sent and received messages can be stored remotely from the device 100 such as in a data store of an associated host system that the communication device 100 communicates with.

The software applications can further include a device state module 140, a Personal Information Manager (PIM) 142, and other suitable modules (not shown). The device state module 140 provides persistence, i.e. the device state module 140 ensures that important device data is stored in persistent memory, such as the flash memory 108, so that the data is not lost when the communication device 100 is turned off or loses power.

The PIM 142 includes functionality for organizing and managing data items of interest to the user, such as, but not limited to, e-mail, contacts, calendar events, voice mails, appointments, and task items. A PIM application has the ability to send and receive data items via the wireless network 200. PIM data items can be seamlessly integrated, synchronized, and updated via the wireless network 200 with the mobile device subscriber's corresponding data items stored and/or associated with a host computer system. This functionality creates a mirrored host computer on the communication device 100 with respect to such items. This can be particularly advantageous when the host computer system is the mobile device subscriber's office computer system. Some or all of the data items stored at the communication device 100 may be indexed for searching on the device 100 either through a corresponding application, such as the PIM 142, or another suitable module. In addition, the items may be searchable using a unified search process implemented in the device operating system 134. For example, application data items can be encapsulated in a searchable entity class and registered with a unified search engine on the device 100 that executes searches against all registered data repositories on the device based on received queries. The search engine can also be configured to invoke a search process of external resources, such as Internet search engines or remote databases.

The communication device 100 also includes a connect module 144, and an information technology (IT) policy module 146. The connect module 144 implements the communication protocols that are required for the communication device 100 to communicate with the wireless infrastructure and any host system, such as an enterprise system, that the communication device 100 is authorized to interface with. Examples of a wireless infrastructure and an enterprise system are given in FIGS. 3 and 4, which are described in more detail below.

The connect module 144 includes a set of Application Programming Interfaces (APIs) that can be integrated with the communication device 100 to allow the communication device 100 to use any number of services associated with the enterprise system or with other systems accessible over the network 200. The connect module 144 allows the communication device 100 to establish an end-to-end secure, authenticated communication pipe with the host system. A subset of applications for which access is provided by the connect module 144 can be used to pass IT policy commands from the host system to the communication device 100. This can be done in a wireless or wired manner. These instructions can then be passed to the IT policy module 146 to modify the configuration of the device 100. Alternatively, in some cases, the IT policy update can also be done over a wired connection.

Other types of software applications can also be installed on the communication device 100. These software applications can be third party applications, which are added after the manufacture of the communication device 100. Examples of third party applications include games, calculators, utilities, etc.

The additional applications can be loaded onto the communication device 100 through at least one of the wireless network 200, the auxiliary I/O subsystem 112, the data port 114, the short-range communications subsystem 122, or any other suitable device subsystem 124. This flexibility in application installation increases the functionality of the communication device 100 and can provide enhanced on-device functions, communication-related functions, or both. For example, secure communication applications can enable electronic commerce functions and other such financial transactions to be performed using the communication device 100.

The data port 114 enables a subscriber to set preferences through an external device or software application and extends the capabilities of the communication device 100 by providing for information or software downloads to the communication device 100 other than through a wireless communication network. The alternate download path can, for example, be used to load an encryption key onto the communication device 100 through a direct and thus reliable and trusted connection to provide secure device communication. The data port 114 can be any suitable port that enables data communication between the communication device 100 and another computing device. The data port 114 can be a serial or a parallel port. In some instances, the data port 114 can be a USB port that includes data lines for data transfer and a supply line that can provide a charging current to charge the battery 130 of the communication device 100.

The short-range communications subsystem 122 provides for communication between the communication device 100 and different systems or devices, without the use of the wireless network 200. For example, the subsystem 122 can include an infrared device and associated circuits and components for short-range communication. Examples of short-range communication standards include standards developed by the Infrared Data Association (IrDA), Bluetooth™, and the 802.11™ family of standards.

In use, a received signal such as a text message, an e-mail message, or web page download will be processed by the communication subsystem 104 and input to the main processor 102. The main processor 102 will then process the received signal for output to the display 110 or alternatively to the auxiliary I/O subsystem 112. A subscriber can also compose data items, such as e-mail messages, for example, using the keyboard 116 in conjunction with the display 110 and possibly the auxiliary I/O subsystem 112. The auxiliary subsystem 112 can include devices such as: a touchscreen, mouse, track ball, infrared fingerprint detector, or a roller wheel with dynamic button pressing capability. The keyboard 116 may be an alphanumeric keyboard and/or telephone-type keypad. However, other types of keyboards can also be used. A composed item can be transmitted over the wireless network 200 through the communication subsystem 104. It will be appreciated that if the display 110 comprises a touchscreen, then the auxiliary subsystem 112 may still comprise one or more of the devices identified above.

For voice communications, the overall operation of the communication device 100 is substantially similar, except that the received signals are output to the speaker 118, and signals for transmission are generated by the microphone 120. Alternative voice or audio I/O subsystems, such as a voice message recording subsystem, can also be implemented on the communication device 100. Although voice or audio signal output is accomplished primarily through the speaker 118, the display 110 can also be used to provide additional information such as the identity of a calling party, duration of a voice call, or other voice call related information.

FIG. 2 shows an exemplary block diagram of the communication subsystem component 104. The communication subsystem 104 includes a receiver 150, a transmitter 152, as well as associated components such as one or more embedded or internal antenna elements 154 and 156, Local Oscillators (LOs) 158, and a processing module such as a Digital Signal Processor (DSP) 160. The particular design of the communication subsystem 104 is dependent upon the communication network 200 with which the communication device 100 is intended to operate. Thus, it should be understood that the design illustrated in FIG. 2 serves only as one example.

Signals received by the antenna 154 through the wireless network 200 are input to the receiver 150, which can perform such common receiver functions as signal amplification, frequency down conversion, filtering, channel selection, and analog-to-digital (A/D) conversion. A/D conversion of a received signal allows more complex communication functions such as demodulation and decoding to be performed in the DSP 160. In a similar manner, signals to be transmitted are processed, including modulation and encoding, by the DSP 160. These DSP-processed signals are input to the transmitter 152 for digital-to-analog (D/A) conversion, frequency up conversion, filtering, amplification and transmission over the wireless network 200 via the antenna 156. The DSP 160 not only processes communication signals, but also provides for receiver and transmitter control. For example, the gains applied to communication signals in the receiver 150 and the transmitter 152 can be adaptively controlled through automatic gain control algorithms implemented in the DSP 160.

The wireless link between the communication device 100 and the wireless network 200 can contain one or more different channels, typically different RF channels, and associated protocols used between the communication device 100 and the wireless network 200. An RF channel is a limited resource that should be conserved, typically due to limits in overall bandwidth and limited battery power of the communication device 100. When the communication device 100 is fully operational, the transmitter 152 is typically keyed or turned on only when it is transmitting to the wireless network 200 and is otherwise turned off to conserve resources. Similarly, the receiver 150 is periodically turned off to conserve power until it is needed to receive signals or information (if at all) during designated time periods. Other communication subsystems, such as the WLAN communication subsystem 105 shown in FIG. 1, may be provided with similar components as those described above configured for communication over the appropriate frequencies and using the appropriate protocols.

FIG. 3 is a block diagram of an exemplary implementation of a node 202 of the wireless network 200. In practice, the wireless network 200 comprises one or more nodes 202. In conjunction with the connect module 144, the communication device 100 can communicate with the node 202 within the wireless network 200. In the exemplary implementation of FIG. 3, the node 202 is configured in accordance with General Packet Radio Service (GPRS) and Global Systems for Mobile (GSM) technologies. The node 202 includes a base station controller (BSC) 204 with an associated tower station 206, a Packet Control Unit (PCU) 208 added for GPRS support in GSM, a Mobile Switching Center (MSC) 210, a Home Location Register (HLR) 212, a Visitor Location Registry (VLR) 214, a Serving GPRS Support Node (SGSN) 216, a Gateway GPRS Support Node (GGSN) 218, and a Dynamic Host Configuration Protocol (DHCP) 220. This list of components is not meant to be an exhaustive list of the components of every node 202 within a GSM/GPRS network, but rather a list of components that are commonly used in communications through the network 200.

In a GSM network, the MSC 210 is coupled to the BSC 204 and to a landline network, such as a Public Switched Telephone Network (PSTN) 222 to satisfy circuit switched requirements. The connection through the PCU 208, the SGSN 216 and the GGSN 218 to a public or private network (Internet) 224 (also referred to herein generally as a shared network infrastructure) represents the data path for GPRS capable mobile devices. In a GSM network extended with GPRS capabilities, the BSC 204 also contains the Packet Control Unit (PCU) 208 that connects to the SGSN 216 to control segmentation, radio channel allocation and to satisfy packet switched requirements. To track the location of the communication device 100 and availability for both circuit switched and packet switched management, the HLR 212 is shared between the MSC 210 and the SGSN 216. Access to the VLR 214 is controlled by the MSC 210.

The station 206 is a fixed transceiver station and together with the BSC 204 form fixed transceiver equipment. The fixed transceiver equipment provides wireless network coverage for a particular coverage area commonly referred to as a "cell". The fixed transceiver equipment transmits communication signals to and receives communication signals from mobile devices within its cell via the station 206. The fixed transceiver equipment normally performs such functions as modulation and possibly encoding and/or encryption of signals to be transmitted to the communication device 100 in accordance with particular, usually predetermined, communication protocols and parameters, under control of its controller. The fixed transceiver equipment similarly demodulates and possibly decodes and decrypts, if necessary, any communication signals received from the communication device 100 within its cell. Communication protocols and parameters can vary between different nodes. For example, one node can employ a different modulation scheme and operate at different frequencies than other nodes.

For all communication devices 100 registered with a specific network, permanent configuration data such as a user profile is stored in the HLR 212. The HLR 212 also contains location information for each registered mobile device and can be queried to determine the current location of a mobile device. The MSC 210 is responsible for a group of location areas and stores the data of the mobile devices currently in its area of responsibility in the VLR 214. Further, the VLR 214 also contains information on mobile devices that are visiting other networks. The information in the VLR 214 includes part of the permanent mobile device data transmitted from the HLR 212 to the VLR 214 for faster access. By moving additional information from a remote HLR 212 node to the VLR 214, the amount of traffic between these nodes can be reduced so that voice and data services can be provided with faster response times and at the same time requiring less use of computing resources.

The SGSN 216 and the GGSN 218 are elements added for GPRS support; namely packet switched data support, within GSM. The SGSN 216 and the MSC 210 have similar responsibilities within the wireless network 200 by keeping track of the location of each communication device 100. The SGSN 216 also performs security functions and access control for data traffic on the wireless network 200. The GGSN 218 provides internetworking connections with external packet switched networks and connects to one or more SGSNs 216 via an Internet Protocol (IP) backbone network operated within the network 200. During normal operations, a given communication device 100 must perform a "GPRS Attach" to acquire an IP address and to access data services. This requirement is not present in circuit switched voice channels as Integrated Services Digital Network (ISDN) addresses are used for routing incoming and outgoing calls. Currently, all GPRS capable networks use private, dynamically assigned IP addresses, thus requiring the DHCP server 220 connected to the GGSN 218. There are many mechanisms for dynamic IP assignment, including using a combination of a Remote Authentication Dial-In User Service (RADIUS) server and a DHCP server. Once the GPRS Attach is complete, a logical connection is established from a communication device 100, through the PCU 208, and the SGSN 216 to an Access Point Node (APN) within the GGSN 218. The APN represents a logical end of an IP tunnel that can either access direct Internet compatible services or private network connections. The APN also represents a security mechanism for the network 200, insofar as each communication device 100 must be assigned to one or more APNs and communication devices 100 cannot exchange data without first performing a GPRS Attach to an APN that it has been authorized to use. The APN can be considered to be similar to an Internet domain name such as "myconnection.wireless.com".

Once the GPRS Attach operation is complete, a tunnel is created and all traffic is exchanged within standard IP packets using any protocol that can be supported in IP packets. This includes tunneling methods such as IP over IP as in the case with some IPSecurity (Ipsec) connections used with Virtual Private Networks (VPN). These tunnels are also referred to as Packet Data Protocol (PDP) Contexts and there are a limited number of these available in the network 200. To maximize use of the PDP Contexts, the network 200 will run an idle timer for each PDP Context to determine if there is a lack of activity. When a communication device 100 is not using its PDP Context, the PDP Context can be de-allocated and the IP address returned to the IP address pool managed by the DHCP server 220.

FIG. 4 is a block diagram illustrating components of an exemplary configuration of a host system 250 with which the communication device 100 can communicate in conjunction with the connect module 144. The host system 250 will typically be a corporate enterprise or other local area network (LAN), but can also be a home office computer or some other private system, for example, in variant implementations. In the example shown in FIG. 4, the host system 250 is depicted as a LAN of an organization to which a user of the communication device 100 belongs. Typically, a plurality of mobile devices can communicate wirelessly with the host system 250 through one or more nodes 202 of the wireless network 200.

The host system 250 comprises a number of network components connected to each other by a network 260. For instance, a user's desktop computer 262a with an accompanying cradle 264 for the user's communication device 100 is situated on a LAN connection. The cradle 264 for the communication device 100 can be coupled to the computer 262a by a serial or a Universal Serial Bus (USB) connection, for example. Other user computers 262b-262n are also situated on the network 260, and each can be equipped with an accompanying cradle 264. The cradle 264 facilitates the loading of information (e.g. PIM data, private symmetric encryption keys to facilitate secure communications) from the user computer 262a to the communication device 100, and can be particularly useful for bulk information updates often performed in initializing the communication device 100 for use. The information downloaded to the communication device 100 can include certificates used in the exchange of messages.

It will be understood by persons skilled in the art that the user computers 262a-262n are typically also connected to other peripheral devices, such as printers, etc., which are not explicitly shown in FIG. 4. Furthermore, only a subset of network components of the host system 250 are shown in FIG. 4 for ease of exposition, and it will be understood by persons skilled in the art that the host system 250 will comprise additional components that are not explicitly shown in FIG. 4 for this exemplary configuration. More generally, the host system 250 can represent a smaller part of a larger network (not shown) of the organization, and can comprise different components and/or be arranged in different topologies than that shown in the exemplary embodiment of FIG. 4.

To facilitate the operation of the communication device 100 and the wireless communication of messages and message-related data between the communication device 100 and components of the host system 250, a number of wireless communication support components 270 can be provided. In some implementations, the wireless communication support components 270 can include a message management server 272, a mobile data server 274, a web server, such as Hypertext Transfer Protocol (HTTP) server 275, a contact server 276, and a device manager module 278. HTTP servers can also be located outside the enterprise system, as indicated by the HTTP server 279 attached to the network 224. The device manager module 278 includes an IT Policy editor 280 and an IT user property editor 282, as well as other software components for allowing an IT administrator to configure the communication devices 100. In an alternative embodiment, there can be one editor that provides the functionality of both the IT policy editor 280 and the IT user property editor 282. The support components 270 also include a data store 284, and an IT policy server 286. The IT policy server 286 includes a processor 288, a network interface 290 and a memory unit 292. The processor 288 controls the operation of the IT policy server 286 and executes functions related to the standardized IT policy as described below. The network interface 290 allows the IT policy server 286 to communicate with the various components of the host system 250 and the communication devices 100. The memory unit 292 can store functions used in implementing the IT policy as well as related data. Those skilled in the art know how to implement these various components. Other components can also be included as is well known to those skilled in the art. Further, in some implementations, the data store 284 can be part of any one of the servers.

In this exemplary embodiment, the communication device 100 communicates with the host system 250 through node 202 of the wireless network 200 and a shared network infrastructure 224 such as a service provider network or the public Internet. Access to the host system 250 can be provided through one or more routers (not shown), and computing devices of the host system 250 can operate from behind a firewall or proxy server 266. The proxy server 266 provides a secure node and a wireless internet gateway for the host system 250. The proxy server 266 intelligently routes data to the correct destination server within the host system 250.

In some implementations, the host system 250 can include a wireless VPN router (not shown) to facilitate data exchange between the host system 250 and the communication device 100. The wireless VPN router allows a VPN connection to be established directly through a specific wireless network to the communication device 100. The wireless VPN router can be used with the Internet Protocol (IP) Version 6 (IPV6) and IP-based wireless networks. This protocol can provide enough IP addresses so that each mobile device has a dedicated IP address, making it possible to push information to a mobile device at any time. An advantage of using a wireless VPN router is that it can be an off-the-shelf VPN component, and does not require a separate wireless gateway and separate wireless infrastructure. A VPN connection may be a Transmission Control Protocol (TCP)/IP or User Datagram Protocol (UDP)/IP connection for delivering the messages directly to the communication device 100 in this alternative implementation.

Messages intended for a user of the communication device 100 are initially received by a message server 268 of the host system 250. Such messages can originate from any number of sources. For instance, a message can have been sent by a sender from the computer 262b within the host system 250, from a different mobile device (not shown) connected to the wireless network 200 or a different wireless network, or from a different computing device, or other device capable of sending messages, via the shared network infrastructure 224, possibly through an application service provider (ASP) or Internet service provider (ISP), for example.

The message server 268 typically acts as the primary interface for the exchange of messages, particularly e-mail messages, within the organization and over the shared network infrastructure 224. Each user in the organization that has been set up to send and receive messages is typically associated with a user account managed by the message server 268. Some exemplary implementations of the message server 268 include a Microsoft Exchange™ server, a Lotus Domino™ server, a Novell Groupwise™ server, or another suitable mail server installed in a corporate environment. In some implementations, the host system 250 can comprise multiple message servers 268. The message server 268 can also be adapted to provide additional functions beyond message management, including the management of data associated with calendars and task lists, for example.

When messages are received by the message server 268, they are typically stored in a data store associated with the message server 268. In at least some embodiments, the data store can be a separate hardware unit, such as data store 284, with which the message server 268 communicates. Messages can be subsequently retrieved and delivered to users by accessing the message server 268. For instance, an e-mail client application operating on a user's computer 262a can request the e-mail messages associated with that user's account stored on the data store associated with the message server 268. These messages are then retrieved from the data store and stored locally on the computer 262a. The data store associated with the message server 268 can store copies of each message that is locally stored on the communication device 100. Alternatively, the data store associated with the message server 268 can store all of the messages for the user of the communication device 100 and only a smaller number of messages can be stored on the communication device 100 to conserve memory. For instance, the most recent messages (i.e. those received in the past two to three months for example) can be stored on the communication device 100.

When operating the communication device 100, the user may wish to have e-mail messages retrieved for delivery to the communication device 100. The message application 138 operating on the communication device 100 can also request messages associated with the user's account from the message server 268. The message application 138 can be configured (either by the user or by an administrator, possibly in accordance with an organization's IT policy) to make this request at the direction of the user, at some pre-defined time interval, or upon the occurrence of some pre-defined event. In some implementations, the communication device 100 is assigned its own e-mail address, and messages addressed specifically to the communication device 100 are automatically redirected to the communication device 100 as they are received by the message server 268.

The message management server 272 can be used to specifically provide support for the management of messages, such as e-mail messages, that are to be handled by mobile devices. Generally, while messages are still stored on the message server 268, the message management server 272 can be used to control when, if, and how messages are sent to the communication device 100. The message management server 272 also facilitates the handling of messages composed on the communication device 100, which are sent to the message server 268 for subsequent delivery.

For example, the message management server 272 can monitor the user's "mailbox" (e.g. the message store associated with the user's account on the message server 268) for new e-mail messages, and apply user-definable filters to new messages to determine if and how the messages are relayed to the user's communication device 100. The message management server 272 can also, through an encoder (not shown) associated therewith, compress message data, using any suitable compression/decompression technology (e.g. YK compression, JPEG, MPEG-x, H.26x, and other known techniques) and encrypt messages (e.g. using an encryption technique such as Data Encryption Standard (DES), Triple DES, or Advanced Encryption Standard (AES)), and push them to the communication device 100 via the shared network infrastructure 224 and the wireless network 200. The message management server 272 can also receive messages composed on the communication device 100 (e.g. encrypted using Triple DES), decrypt and decompress the composed messages, re-format the composed messages if desired so that they will appear to have originated from the user's computer 262*a*, and re-route the composed messages to the message server 268 for delivery.

Certain properties or restrictions associated with messages that are to be sent from and/or received by the communication device 100 can be defined (e.g. by an administrator in accordance with IT policy) and enforced by the message management server 272. These may include whether the communication device 100 can receive encrypted and/or signed messages, minimum encryption key sizes, whether outgoing messages must be encrypted and/or signed, and whether copies of all secure messages sent from the communication device 100 are to be sent to a pre-defined copy address, for example.

The message management server 272 can also be adapted to provide other control functions, such as only pushing certain message information or pre-defined portions (e.g. "blocks") of a message stored on the message server 268 to the communication device 100. For example, in some cases, when a message is initially retrieved by the communication device 100 from the message server 268, the message management server 272 can push only the first part of a message to the communication device 100, with the part being of a pre-defined size (e.g. 2 KB). The user can then request that more of the message be delivered in similar-sized blocks by the message management server 272 to the communication device 100, possibly up to a maximum pre-defined message size. Accordingly, the message management server 272 facilitates better control over the type of data and the amount of data that is communicated to the communication device 100, and can help to minimize potential waste of bandwidth or other resources.

The mobile data server 274 encompasses any other server that stores information that is relevant to the corporation. The mobile data server 274 can include, but is not limited to, databases, online data document repositories, customer relationship management (CRM) systems, or enterprise resource planning (ERP) applications. The mobile data server 274 can also connect to the Internet or other public network, through HTTP server 275 or other suitable web server such as an File Transfer Protocol (FTP) server, to retrieve HTTP webpages and other data. Requests for webpages are typically routed through mobile data server 274 and then to HTTP server 275, through suitable firewalls and other protective mechanisms. The web server then retrieves the webpage over the Internet, and returns it to mobile data server 274. As described above in relation to message management server 272, mobile data server 274 is typically provided, or associated, with an encoder 277 that permits retrieved data, such as retrieved webpages, to be decompressed and compressed, using any suitable compression technology (e.g. YK compression, JPEG, MPEG-x, H.26x and other known techniques), and encrypted (e.g. using an encryption technique such as DES, Triple DES, or AES), and then pushed to the communication device 100 via the shared network infrastructure 224 and the wireless network 200. While encoder 277 is only shown for mobile data server 274, it will be appreciated that each of message server 268, message management server 272, and HTTP servers 275 and 279 can also have an encoder associated therewith.

The contact server 276 can provide information for a list of contacts for the user in a similar fashion as the address book on the communication device 100. Accordingly, for a given contact, the contact server 276 can include the name, phone number, work address and e-mail address of the contact, among other information. The contact server 276 can also provide a global address list that contains the contact information for all of the contacts associated with the host system 250.

It will be understood by persons skilled in the art that the message management server 272, the mobile data server 274, the HTTP server 275, the contact server 276, the device manager module 278, the data store 284 and the IT policy server 286 do not need to be implemented on separate physical servers within the host system 250. For example, some or all of the functions associated with the message management server 272 can be integrated with the message server 268, or some other server in the host system 250. Alternatively, the host system 250 can comprise multiple message management servers 272, particularly in variant implementations where a large number of mobile devices need to be supported.

The device manager module 278 provides an IT administrator with a graphical user interface with which the IT administrator interacts to configure various settings for the communication devices 100. As mentioned, the IT administrator can use IT policy rules to define behaviors of certain applications on the communication device 100 that are permitted such as phone, web browser or Instant Messenger use. The IT policy rules can also be used to set specific values for configuration settings that an organization requires on the communication devices 100 such as auto signature text, WLAN/VoIP/VPN configuration, security requirements (e.g. encryption algorithms, password rules, etc.), specifying themes or applications that are allowed to run on the communication device 100, and the like.

Figure 5:
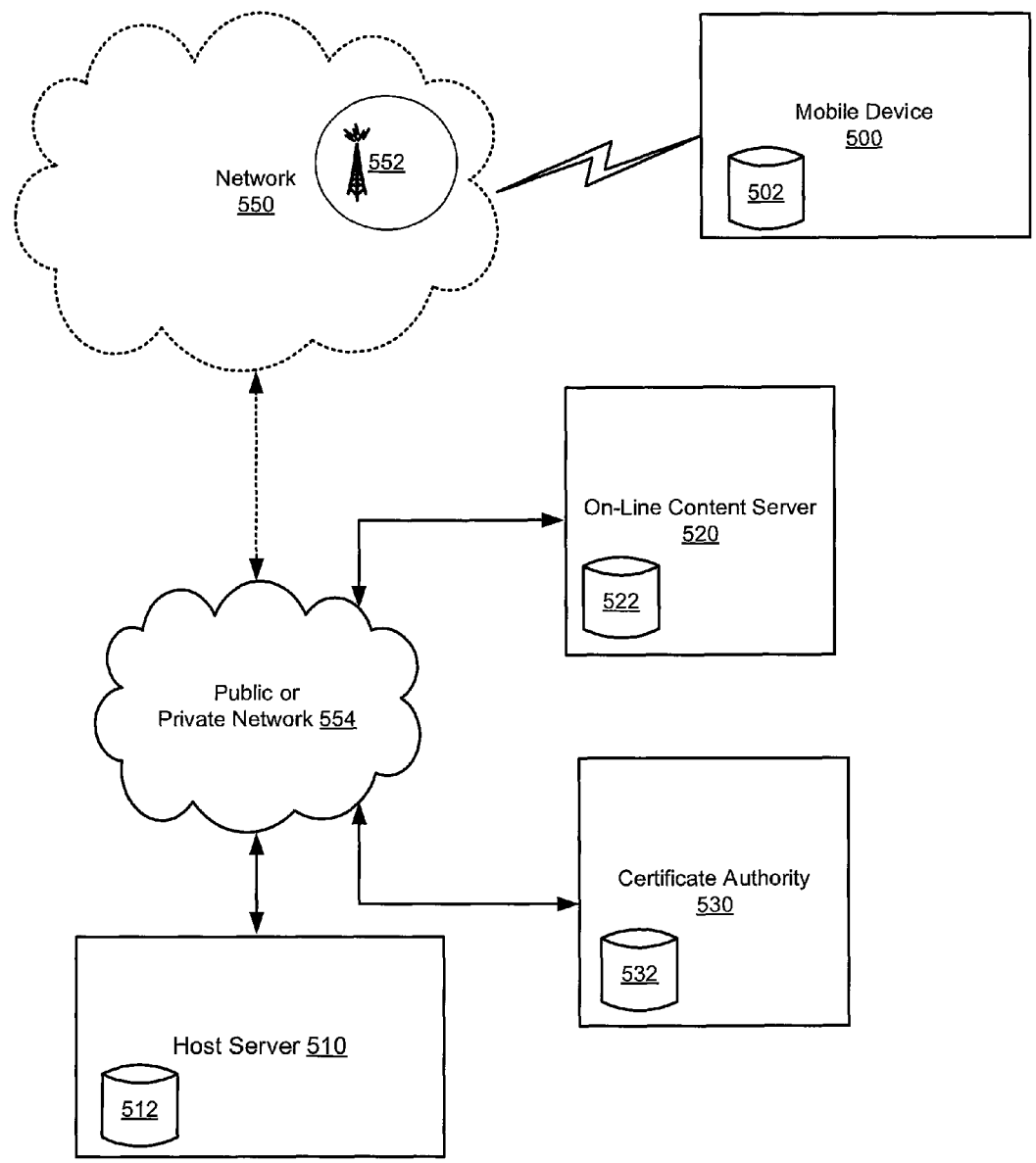
FIG. 5 is a block diagram illustrating an embodiment of a mobile device accessing an on-line content server.

Referring to FIG. 5, an embodiment is illustrated where computing device 500 comprises a mobile computing device 500 that may access a wireless network 550, for instance through node 552. In the embodiment illustrated, mobile device 500 includes a mobile data store 502 which may comprise a secure data store.

The wireless network 550 is connected to a public or private network 554 which provides connectivity to host server 510. As illustrated, in this embodiment, host server 510 may comprise a host data store 512. The host server 510 may comprise a server within the host system 250, or may comprise some other server providing instructions to computing device 500.

Also available on the network 554 is an on-line content server 520 and a certificate authority 530. As illustrated, in this embodiment, the on-line content server 520 may comprise a content data store and the certificate authority 530 may comprise an authority data store 532.

Depending upon the embodiment, the host server 510, on-line content server 520 and certificate authority 530 may comprise different systems or the same system providing different functionality. A corporate embodiment, for instance, may include a host server 510 for data storage and control of the mobile device 500 as described above. A personal embodiment may include a host server 510 that is transparent to the user, or may exclude a host server 510 entirely and rely upon the user for instructions or settings.

The certificate authority 530 may comprise the host server 510 or may comprise a third party Certificate Authority as illustrated in FIG. 5. The host server 510 may maintain local copies of certificates and certificate authentication in host data store 512, that may be periodically updated from a third party certificate authority 530.

In an embodiment, mobile device 500 may attempt to access content available from the on-line content server 520. In the embodiment, the device 500 seeks to establish a secure connection, for instance a unilateral TLS connection, with the on-line content server 520. A secure connection may comprise a connection in which at least one party to the connection, for instance the on-line content server 520, is authenticated by the requesting party, in this case device 500. A secure connection may further comprise establishing encryption keys shared between the two parties, for instance through a Diffie-Hellman key exchange, after which communications over the secure connection may be encrypted. In some embodiments, a secure connection may comprise the requesting party comparing the URL or IP address of the other party with a list of trusted parties maintained on the requesting device. After establishing a secure connection, the device 500 may download information from the on-line content server 520 to present an authentication portal to a user of the device.

Figure 6:
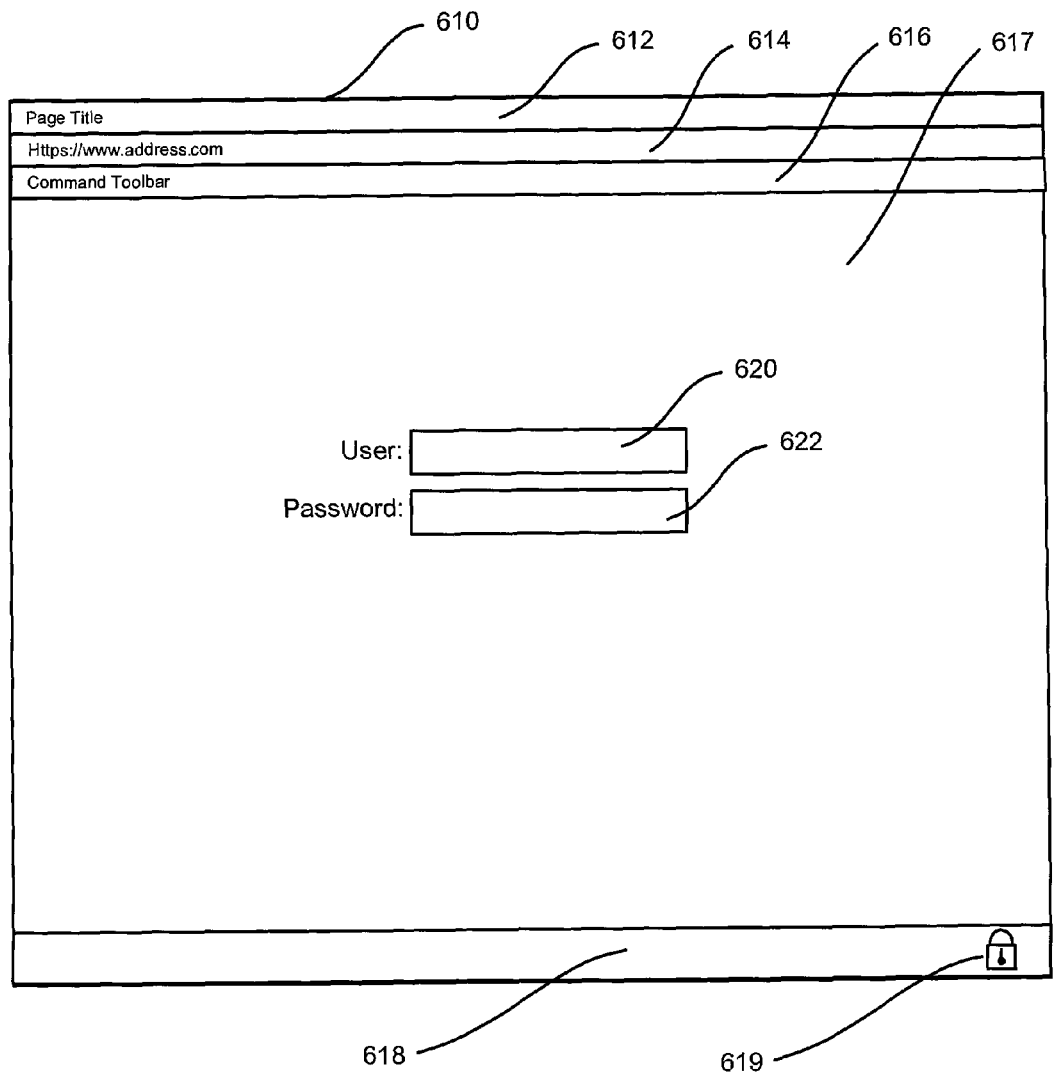
FIG. 6 is a diagram illustrating a web page presented to a user accessing an on-line resource.

Referring to FIG. 6, an exemplary screen shot of an authentication portal is shown as typically constructed by conventional web browsers that may be shown, for instance, on a user interface of device 500. A web page 610 as typically presented to a user includes a title bar 612 at the top of the page. An address bar 614 identifies the address of the web content being presented. One or more command toolbars 616 include browser commands actionable by the user to direct the functionality of the browser to locate and view on-line content. A content area 617 comprises most of the area of the browser page where on-line content is presented. The lower section of the page typically comprises an information bar 618 that conveys information about the page to the user. In the example presented a lock icon 619 is indicating to the user that this page is being viewed over a secure connection to the on-line content server 520. The use of a lock icon 619 is merely an example of information that may, but not necessarily, be presented in the information bar 618. Some browsers may not present any indication in the information bar 618 when a web page is being accessed through a secure connection.

In the example of FIG. 6, an authentication portal is presented with a user credential field 620 and a user password field 622 being presented for user input. In common usage the address bar 614 and information bar 618 convey information to the user that is intended to alert the user that this resource is 'safe' to enter personal information as the lock icon 619 is displayed in the information bar 618 and the address bar 614 includes the "https" prefix to the web address.

Typically, a browser will enter into a secure connection if the protocol meets the minimum security settings allowed by browser settings. The browser settings are theoretically set by a user, though more commonly consist of default settings for a particular security 'level' chosen by a user. The browser settings generally apply to all web sites visited and do not automatically increase for websites that request personal information. A user can generally override default settings, for instance to identify a particular website as "SAFE" or "TRUSTED" so that standard safeguards do not apply for that site. Once a user has categorized a web address, the security settings of web pages accessed through that address typically remain at the same level though the content and level of interaction may change with time.

Figure 7:
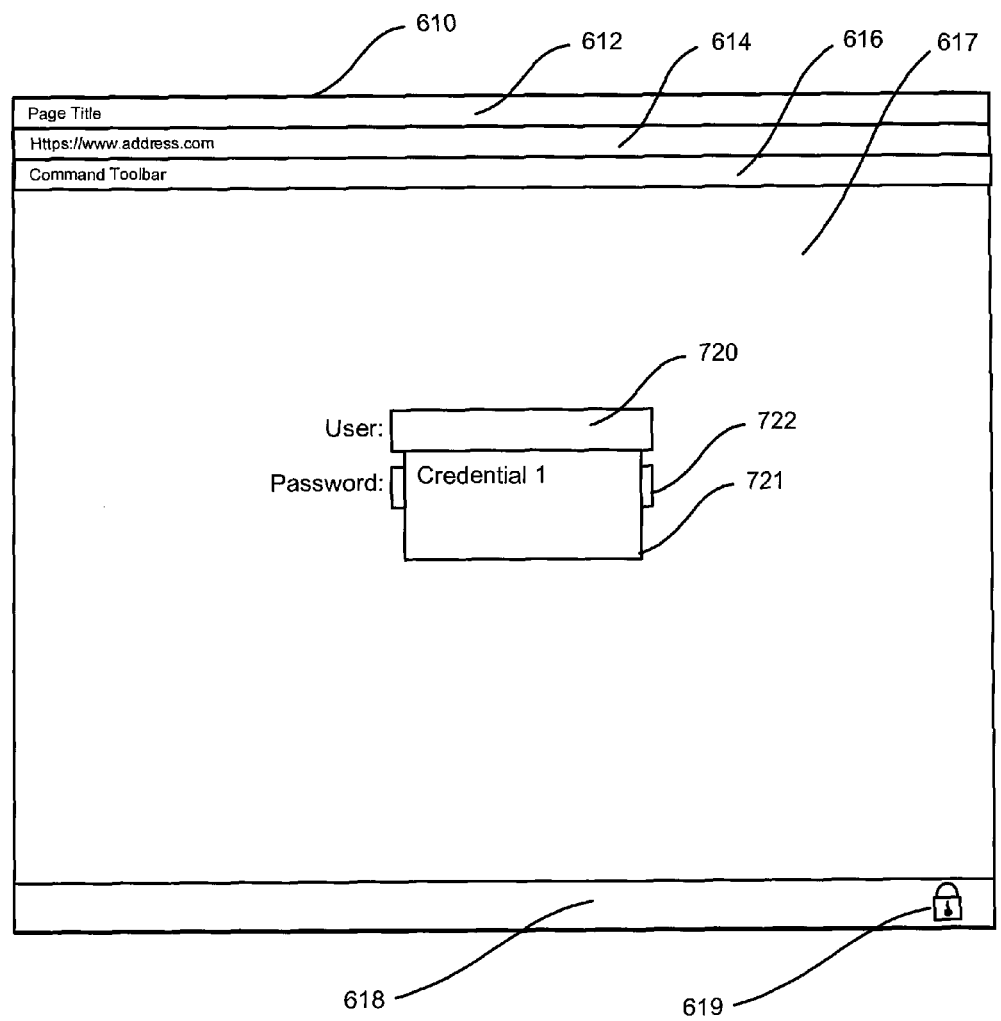
FIG. 7 is a diagram illustrating another web page presented to a user accessing an on-line resource.

A common feature of web browsers is the "AUTOFILL" feature which identifies user input fields that have previously been filled in by the user and information previously supplied by the user is retrieved from storage and presented as an option for the user relieving the user of the necessity of entering the information themselves. FIG. 7 illustrates a common type of "AUTOFILL" where a dropdown list 721 of one or more entries is presented to the user for selection to enter into the credential field 720. In the example illustrated a single entry, "Credential 1", is being presented for selection by the user. The credential may also be entered into the credential field 720 with user input such as typing input into a user interface of the device 500.

Typically, a stored password associated with the selected entry will be automatically entered into the password field 722 after the desired entry has been selected by the user. The password associated with the credential entered into the credential field 720 may typically be retrieved from storage by the browser and entered into the password field 722. Passwords are typically displayed with wildcard digits, such as "*", in place of each actual password digit for security reasons. Passwords may also be entered into the password field 722 with user input such as typing input into a user interface of the device 500.

In typical prior art embodiments, the address bar 614 and lock icon 619 (if present) will only be visible when a user is entering information into the credential field 720 and password field 722 if a majority of the web page 610 is viewable within a viewable area of a screen of the computing device being used to access the on-line resource 520. On devices with smaller viewing screens, the web page 610 may not be completely visible, for instance, if the web page extends beyond a viewable portion of the screen. The prior methods rely upon a user to confirm the presence of a relatively small indication, to identify that the connection is secure before entering personal information.

In the context of a mobile device with a more limited viewing screen, the prior methods may further require a user to scroll about the available viewing area to locate such information on the web page 610 since the mobile device screen is typically too small to include the entire web page 610. Furthermore, in some browsers currently in use for mobile devices, there is no address bar 614, command toolbar 616 or information bar 618 included on the mobile web page being displayed. Typically, a user is required to actuate a user input interface of the device, such as a button, to access a menu of command options for selection. In either case, a state of the connection is typically not indicated to the user within the viewable area of the device when the credential field 720 or password field 722 is being presented to the user.

Figure 8A:
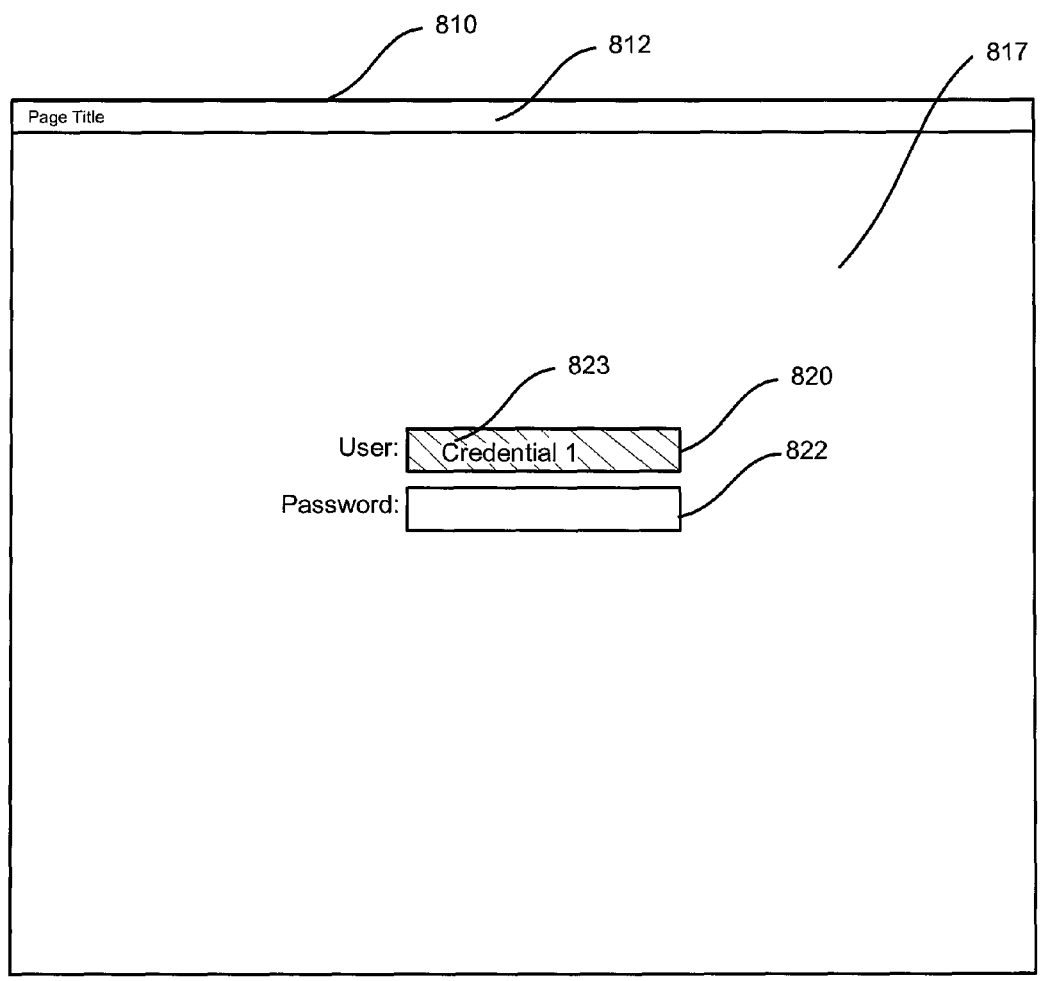
FIGS. 8a and 8b are diagrams illustrating embodiments of a visual indication.

Referring to FIG. 8a, in a first embodiment, the device 500 is operative to alert the user to a security state of the device 500, such as a state of the connection with the on-line content server 520 upon the content being entered that is identified by the device 500 as protected information, such as personal information or corporate data, into data fields of a web page 810 hosted by the on-line content server 520. The device 500 may identify protected information based upon criteria stored in one or more data stores accessible to the device. The data stores may comprise data stores resident on the device 500, such as mobile data store 502, or may comprise data stores accessible to the device 500 over a network, such as host server data store 512 accessible over the public or private network 554.

The criteria may, for instance, comprise elements of: content; characteristics of the form of content (such as number or type of characters); content of identifiers for content entry fields soliciting input from a user; or, characteristics of an application soliciting content from a user. In the latter case, the criteria may for instance require the device 500 to determine whether the application is a trusted application, for instance a corporate application identified by criteria specified by the host server 510, or an untrusted application, for instance a third party application unknown or unapproved by the corporation.

The computing device 500 may detect entered content as protected information by matching the criteria to information related to the solicitation for content. For instance, the computing device 500 may match the entered content with specific content stored in one or more data stores accessible to the computing device 500. In an aspect, a server 510 in communication with the device 500 may send the specific content for storage on the device 500 to be used in the matching process. An example of this aspect may be key words known to a corporate entity, such as confidential project names, that would identify protected information. In an aspect, the device 500 may search data stores of the device, such as a calendar, mail program or address book, for the specific content.

In the embodiment of FIG. 8a, a web page 810 includes a title bar 812, content area 817, a credential field 820 and a password field 822 for receiving content from the user. Content entered into either the credential field 820 or the password field 822 may be identified as protected information by the device 500. The criteria may specify, for instance the substance of the content entered into credential field 820, such as the phrase "Credential 1" shown in FIG. 8a, as protected information. Alternatively, the criteria may specify that the credential field identifier "User" identifies a field that is soliciting protected information. In either case, once the device 500 detects the entry of protected information into the credential field 820, in an embodiment the device 500 may highlight the information as a highlighted credential 823 to alert the user that protected information is being entered into a web page 810 and the device 500 is in a security state below the pre-determined security threshold. The security state may be below the pre-determined security threshold, for instance, as the device 500 may not have established a secure connection with the on-line content server 520 that hosts the web page 810. The highlighted credential 823 comprises a visual indication of the security state of the device 500, such as a connection state or application state, when a user is entering protected content into the device 500.

Figure 8B:
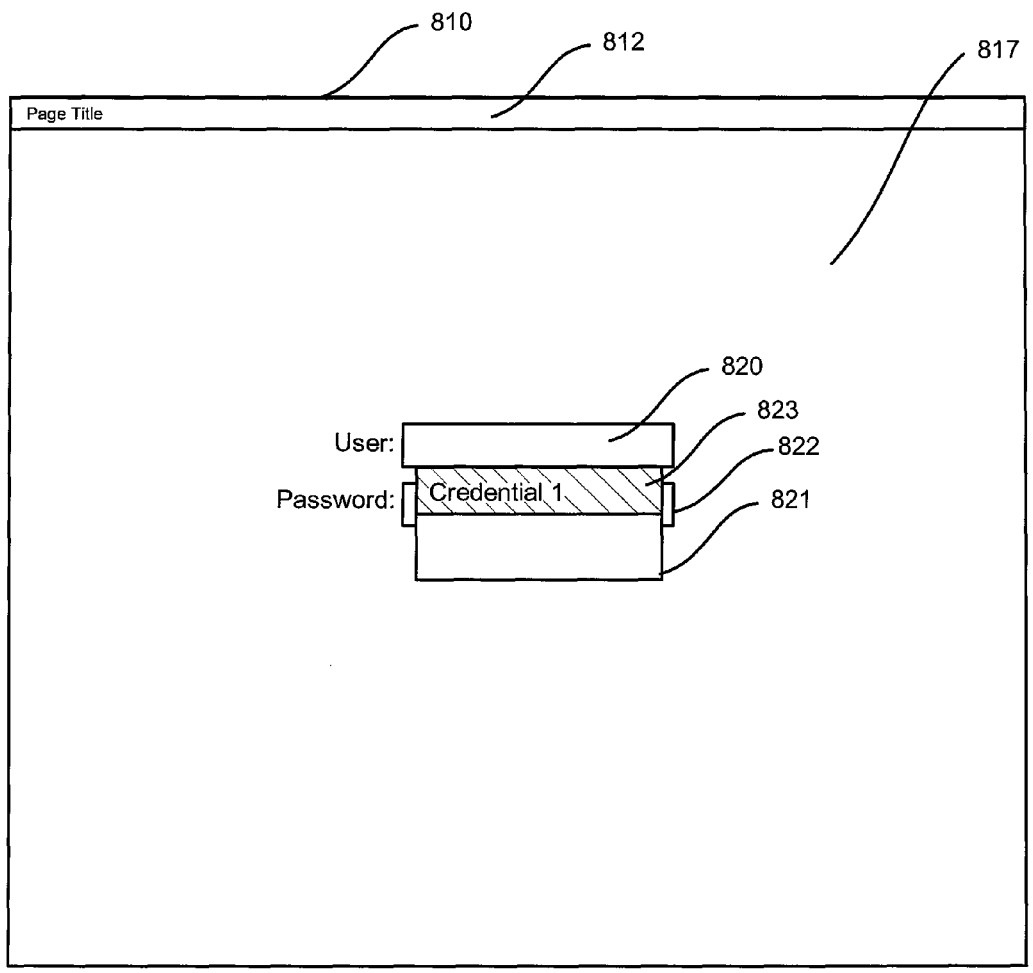

Similar to the example of FIG. 7, the embodiment of FIG. 8b includes a drop-down list 821 of possible user credentials generated by the browser for selection by a user of the device 500. The user credentials generated by the browser may comprise entered content. In the embodiment of FIG. 8b, however, the credential generated by the browser that is available for selection is highlighted as a highlighted credential 823 to alert the user that protected information is being entered into a web page 810 and the device 500 is in a security state below the pre-determined security threshold. The highlighted credential 823 provides the user with a visual indication that content generated by the browser, and made available for selection, is protected information and the security state of the device 500, such as a connection state or application state, is below the pre-determined security threshold.

The security threshold may comprise minimum requirements for a secure connection as specified by the user, initial default settings of the device or as specified by an IT policy sent to the device 500 from the host system 250. By way of example, the security threshold may require that the device 500 has authenticated the on-line content server 520, verified a security certificate of the on-line content server 520 and/or established an encrypted connection with the on-line content server 520, for instance by completing a TLS protocol between the device 500 and the on-line content server 520.

In an embodiment, the device 500 may determine whether or not to present a visual indication of the security state of the device 500 when the connection state with the on-line content server 520 is below a security threshold and content entered by the user, such as content entered into the credential field 820 is identified by the device 500 as being protected information. In the embodiment illustrated in FIG. 8, credential field 820 is being auto-filled using a selection by the user from the drop-down list 821. Credential field 820 may also be filled, for instance, by a user typing in text. In either case, the device 500 is operative to identify the content as protected information and evaluate the security state of the device 500, such as the connection state, to determine that it is below a security threshold. Upon determining that protected information is being entered into credential field 820, and that the connection state is below the security threshold, the device 500 presents a visual indication to the user.

In the embodiment of FIG. 8, the visual indication comprises a highlighted credential 823. In another embodiment, the visual indication may be more disruptive of the browsing experience to require the user to make an active selection before proceeding with submitting protected information through a connection, or application, which is below the security threshold.

Figure 9:
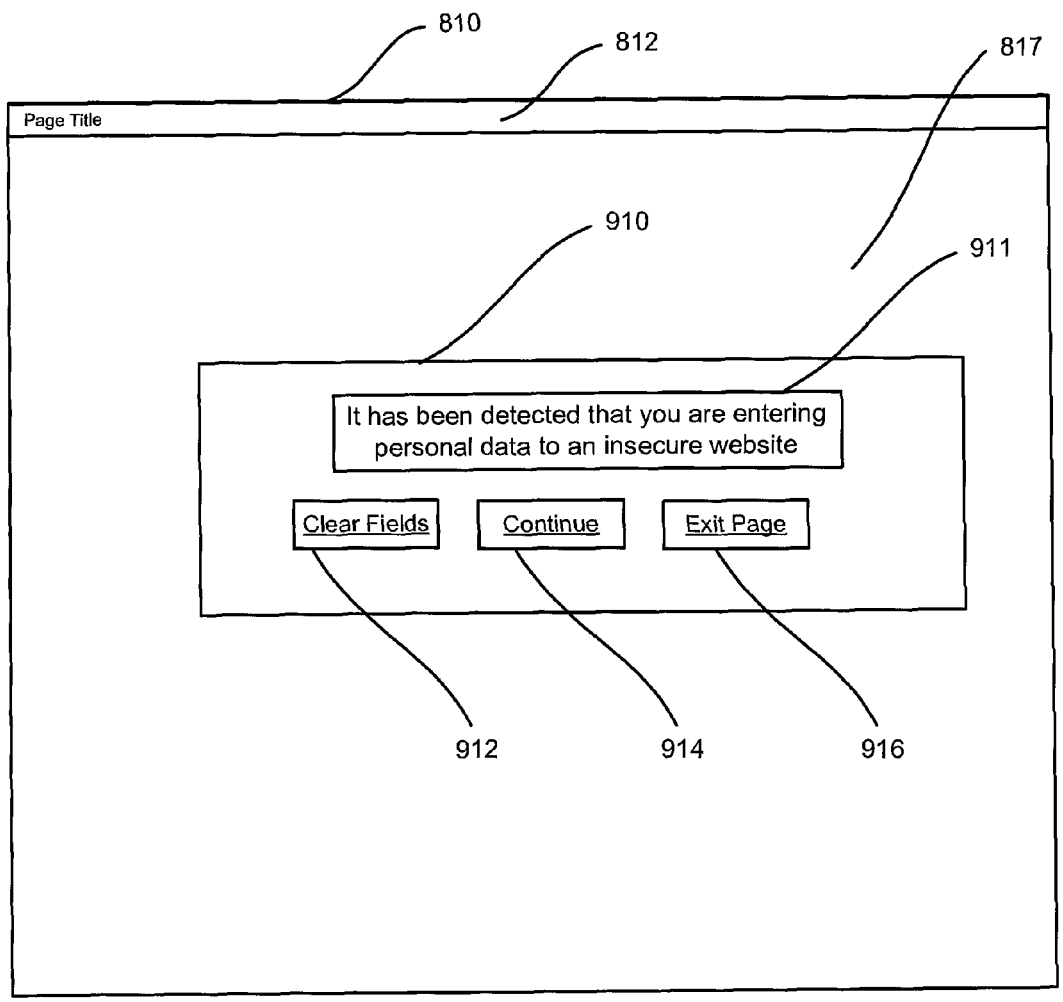
FIG. 9 is a diagram illustrating an embodiment of a visual indication.

Referring to FIG. 9, in an embodiment, the visual indication comprises a window 910 that includes a warning 911 and option buttons 912 914 916 that may be selected by a user to proceed. In the embodiment illustrated, the window 910 includes a clear field button 912 that will clear all user entered content when selected by the user. In an alternate embodiment, depressing the clear field button 912 will cause the device 500 to clear the entered content identified by the device 500 as protected information, and entered content that has not been identified as protected information will remain entered for review by the user. A continue button 914 clears the window 910 and allows the user to proceed with submitting the protected information to the website. An exit page button 916 may close the window or direct the user to a pre-determined page, such as a home page, to directly navigate away from the web site. The exit page button 916 may be useful, for instance, where a user is expecting a secure connection and decides to directly leave the web site.

Figure 10:
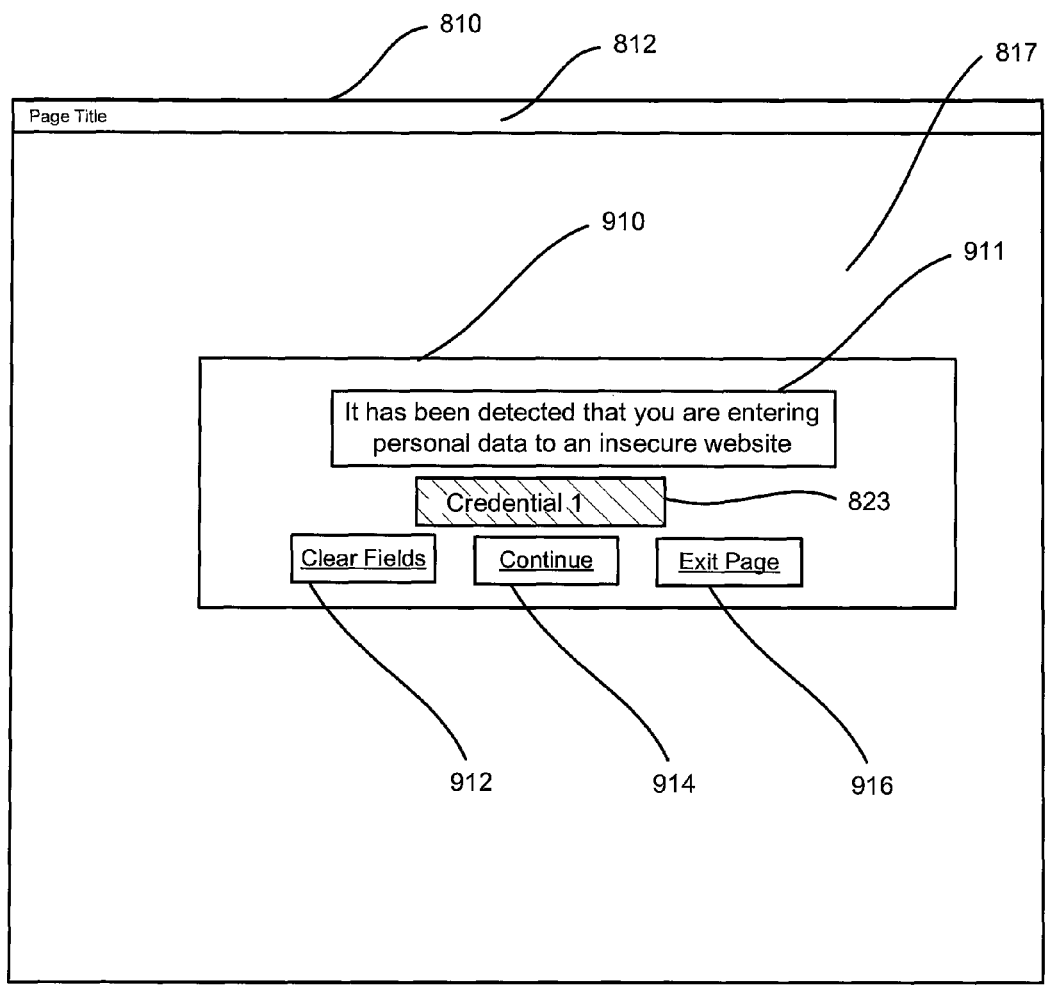
FIG. 10 is a diagram illustrating an embodiment of a visual indication.

In an embodiment, the window 910 may be combined with the highlighted credential 823 to identify potential protected information to the user. In the embodiment, the window 910 may either be located so as to not obstruct the credential field 820, or, as indicated in FIG. 10, the window 910 may include the highlighted credential 823 to provide additional information to assist the user in selecting an option button 912 914 916.

Figure 11:
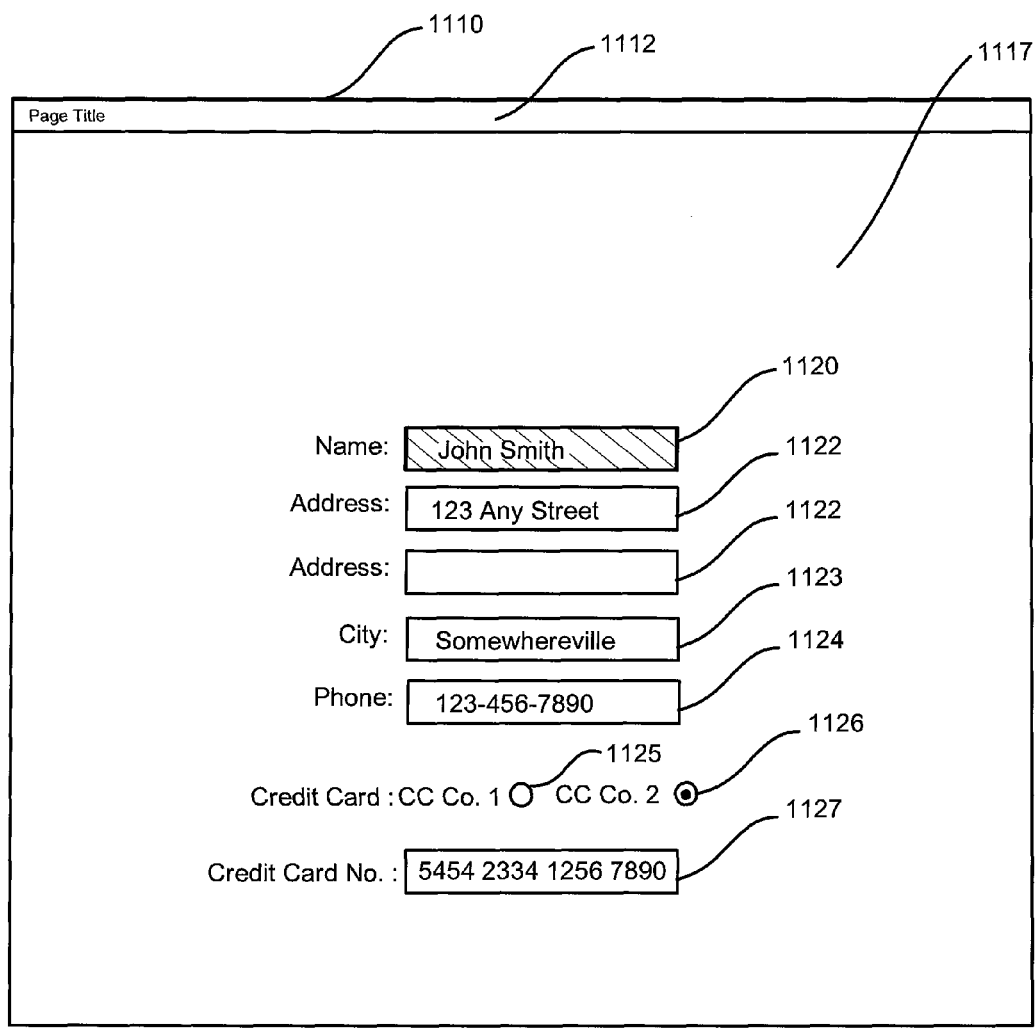
FIG. 11 is a diagram illustrating an embodiment of a visual indication.

Referring to FIG. 11, the device 500 is operative to alert the user to a security state of the device 500, such as a state of the connection with the on-line content server 520, upon the user entering content identified by the device 500 as protected information into data fields of a web page 1110 hosted by the on-line content server 520. In the embodiment of FIG. 11, a web page 1110 includes content area 1117, a title bar 1112, a name field 1120, address fields 1122, city field 1123, phone number field 1124, credit card selection radio buttons 1125 1126 (selected), and credit card field 1127 for receiving content from the user. Content entered into the fields 1120 1122 1123 1124 1125 1126 1127 may be identified as protected information by the device 500. Radio buttons 1125 and 1126 may be considered to constitute personal information when a button 1126 is selected, depending upon the type of information conveyed by the selection. In an embodiment, for instance, the device 500 may consider all financial information, including a selected credit card company, to be protected information.

In the embodiment of FIG. 11, the device 500 is operative to identify the name entered in name field 1120 as personal information and evaluate the security state of the device 500, such as the connection state, to determine that it is below a security threshold. Upon determining that personal information comprising protected information is being entered into credential field 820, and that the connection state is below the security threshold, the device 500 presents a visual indication to the user. In the embodiment of FIG. 11, the visual indication comprises a highlighting of the name field 1120. Other forms of visual indication include the windows of FIGS. 9 and 10.

Figure 12:
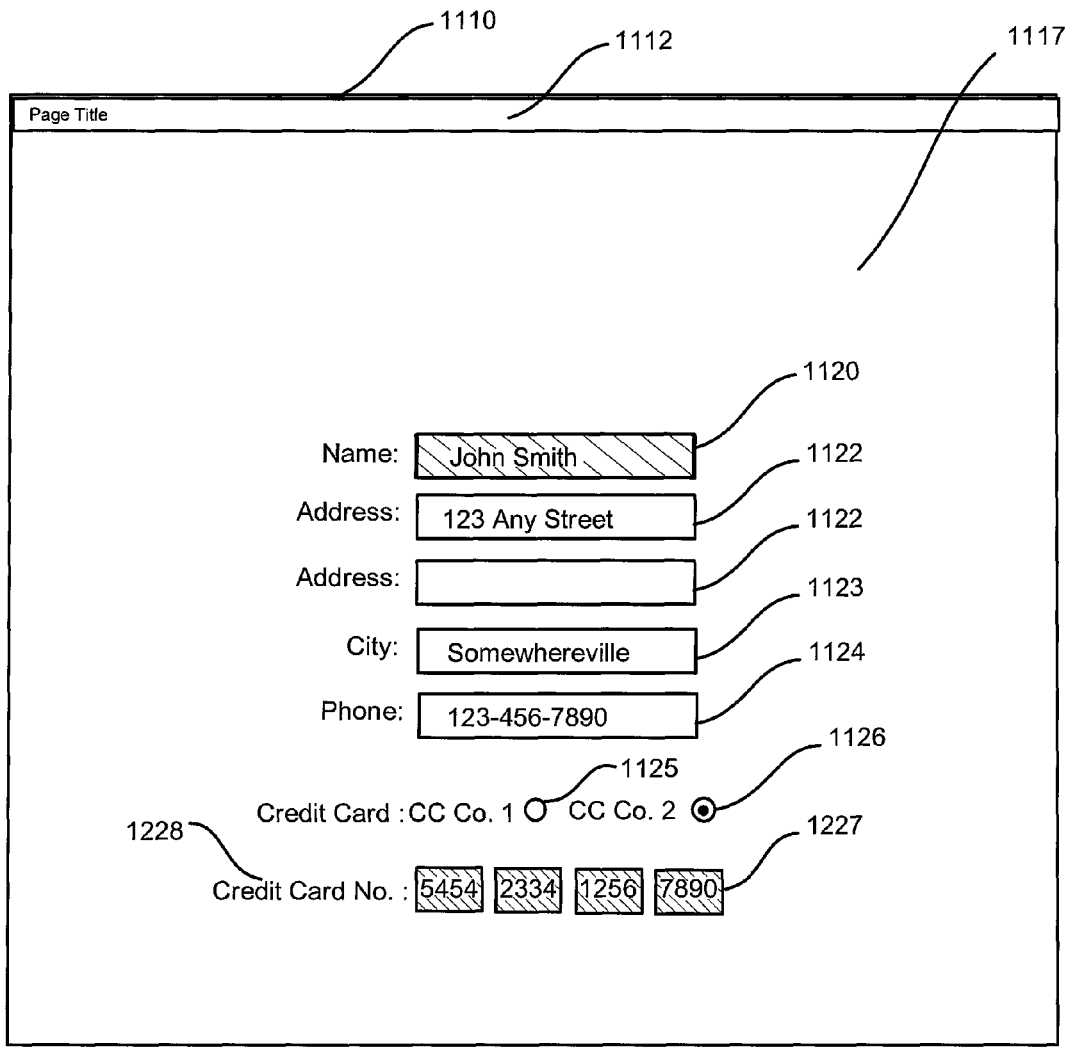
FIG. 12 is a diagram illustrating an embodiment of a visual indication.

In the embodiment of FIG. 12, the device 500 is operative to identify the name entered in the name field 1120 and the credit card number entered into credit card field 1227 as personal information of the user that is protected information, evaluate the security state of the device 500, such as the connection state, to determine that it is below a security threshold and present a visual indication to the user that protected information has been entered and the connection is below the security threshold. In the embodiment of FIG. 12, the visual indication comprises a highlighting of the name field 1120 and the credit card number field 1227. Other forms of visual indication include the windows of FIGS. 9 and 10.

Protected information may comprise personal information of the device user as may be identified from information stored in data stores accessible to the device 500. In an embodiment, the personal information may be identified by the device by matching the field identifiers accompanying the fields, such as the "Credit Card No." identifier 1228 shown in FIG. 12. In the embodiment, the device 500 may be operative to scan the information presented by the web page 1110 and identify key phrases or identifiers that match a list of personal information identifiers maintained by the device 500. Content entry fields adjacent to personal information identifiers may be flagged by the device 500 before a user has entered content into the field. Upon entry of content into the field, the device 500 may evaluate the security state of the device 500 and provide a visual indication to the user if the security state is below the pre-determined threshold.

In an embodiment, the device 500 may be operative to identify potential protected information including personal information based upon characteristics of the content entered by the user, or the form of the content fields presented by the device 500. In FIG. 12, for instance, the credit card number field 1227 comprises four discrete content entry fields each containing 4 numeric digits. The device 500 may be operative to identify this arrangement of information as potentially comprising financial information and flag the information as being deemed protected information. Upon entry of content that is flagged as being deemed protected information, the device 500 may evaluate the security state of the device 500 and provide a visual indication to the user if the security state is below the pre-determined threshold. In the embodiment characteristics of the form of the data entered by the user is retained within a store accessible to the device 500.

Accordingly, the device 500 may be operative to identify protected information based upon matching entered information, content entry field identifiers and/or characteristics of the form of data entered by the user into a user input interface of the device 500 with criteria stored in one or more data stores accessible to the device 500.

In an embodiment, the device 500 may receive content from a remote system, such as host server 510, the content comprising identifying content for identifying content that should be protected by the device 500. By way of example, the remote system may comprise a corporate server and the identifying content may comprise a list of terms or phrases that describe sensitive corporate content that the corporation would like to protect. In the embodiment, the device 500 is operative to include the identifying content received from the remote system as criteria when monitoring entered content for protected information.

In an embodiment, the entered content may be identified as protected information when a measure of protected information has been detected by the device 500 that exceeds a protected information threshold. Criteria stored in the one or more data stores may comprise both an identifier to identify information entered into the user input interface and a weight for the sensitivity of the information. The weight may vary with the type of information being entered into each content entry field. Financial information, for instance, may be considered of higher weight than address information.

The device 500 may be operative to receive user input setting a weight of information the device 500 has identified as being potential personal information that should be protected. In an embodiment, the weight may be imposed upon the device 500 by a remote server such as host server 510. In the example of a corporate server above, the device 500 may receive identifying content and corresponding weights from the remote system.

The device 500 may, in an embodiment, be operative to identify entered content as protected information when the amount of entered content modified by the weight for each type of information exceeds the protected information threshold. Accordingly more low weight information would need to be entered into the content entry fields before the device 500 interrupts the user by presenting the visual indication. By way of example, financial information, such as a credit card number, may be considered of sufficient weight to merit presentation of the visual indication when it is the only content being entered.

In an embodiment, in addition to the visual indication described above, the device 500 may further be operative to enter a protected mode of operation when a match is made between entered content and searched information and a security state of the device 500 is below the pre-determined threshold. In the protected mode of operation, the device 500 may be rendered inoperative to send information to the on-line content server 520 until the user has cleared the operation by selecting the appropriate option button, for instance the continue button 914 in the embodiment of FIG. 9 or FIG. 10. The protected mode of operation may, for instance, prohibit HTTP POST operations. Once the user has cleared the operation, the device may revert from the protected mode of operation to a normal mode of operation that renders the device 500 operative to send information to the on-line content server 520. The normal mode of operation, for instance, allows HTTP POST operations.

In an embodiment, the device 500 determines that information entered into credential field 820 is protected information that should be protected by the device 500 by comparing the entered content with criteria stored in one or more data stores. The data stores may be resident on the device 500, or in an embodiment may be accessible through a network connection to a trusted server such as host server 510.

The device 500 may search the one or more data stores upon detecting a connection below the security threshold and the user, or an auto-fill function of the browser, entering information into a field of a web page. The device 500 may search the one or more data stores for criteria. In an embodiment, the data stores to be searched may be selected by the user, or may be determined by an instruction received, for instance, from host system 250 or host server 510. In an embodiment, the one or more data stores may comprise general data stores such as a calendar, address book, owner information, messages, custom dictionary or other information store. In the embodiment the data stores are general information data stores that may include personal information.

In an embodiment, the device 500 may compare the entered content with the contents of a personal information data store of the device 500. The personal information data store containing personal information either entered directly by the user for the purpose of identifying sensitive personal information to be protected or may comprise information collected from the user that has been identified as personal information by the device 500. The device 500 may, for instance, collect user credentials previously entered by the user to be stored in the personal information data store. The device 500 may, for instance, also collect information such as address information, financial information, contact information or other information for storage in the personal information data store. The information may be collected by the device 500 identifying the type of content being entered by a user from field headings presented by a web page to identify the intended information to be entered into a field. The content may be collected by the device 500 identifying the type of information being entered by a user from meta data included in the web page content downloaded from the on-line content server 520.

In an embodiment, the device 500 may maintain a list or table of protected information as the criteria. The list may be built from information collected by the device 500 including by searching data stores accessible to the device 500 or from identifying content received by the device 500 from a remote server such as host server 510. The device 500 may retain the list in a secure store of the device 500. Upon detecting a user entering content through a user input interface, the device 500 may compare the entered content with the list to identify protected information. In an aspect, the device 500 may be operative to compare content field identifiers from web pages rendered by the device 500 and to compare the content field identifiers with the list to identify content fields that may be seeking protected information from the user.

In an embodiment, the security state of the device 500 may be dependent upon a nature of an application executed on the device 500. In an aspect, a non-trusted application may comprise an insecure state of the device 500 and the device 500 may be operative to monitor the user input interface for content entered by the user that may comprise protected information when the device 500 is in the insecure state. In such a fashion, the device 500 may be operative to monitor non-trusted applications executed on the device 500 that may solicit protected information from the user. The device 500 may, in an embodiment, compare entered content with the stored criteria, such as the list of protected information, when a non-trusted application is executed on the device 500.

In an embodiment, the security threshold comprises a pre-selected level of security. A user may enter the pre-selected level of security into the device 500, or the device 500 may receive the pre-selected level of security, for instance as an instruction from host system 250 through the wireless network 550. The security state of the device 500 may be determined by the settings of the secure connection established between the device 500 and the on-line content server 520. The settings may include the certificate of the on-line content server 520 and the specified public key encryption algorithm, a minimum encryption key length, a certificate state of the certificate of the on-line content server 520, a certificate expiry date of the certificate of the on-line content server 520, a certificate trust of the certificate of the on-line content server 520 or a session key strength of the security protocol established between the device 500 and the on-line content server 520.

The systems and methods disclosed herein are presented only by way of example and are not meant to limit the scope of the subject matter described herein. Other variations of the systems and methods described above will be apparent to those in the art and as such are considered to be within the scope of the subject matter described herein. For example, it should be understood that steps and the order of the steps in the processing described herein may be altered, modified and/or augmented and still achieve the desired outcome.

The systems' and methods' data may be stored in one or more data stores. The data stores can be of many different types of storage devices and programming constructs, such as RAM, ROM, flash memory, programming data structures, programming variables, etc. It is noted that data structures describe formats for use in organizing and storing data in databases, programs, memory, or other computer-readable media for use by a computer program.

Code adapted to provide the systems and methods described above may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code.

A portion of the disclosure of this patent document contains material which is subject to copyright protection. The copyright owner has no objection to the facsimile reproduction by any one of the patent document or patent disclosure, as it appears in the Patent and Trademark Office patent file or records, but otherwise reserves all copyrights whatsoever.

The invention claimed is:

1. A method for a computing device communicating security information, the method comprising:
   receiving online content from a server connected to the computing device via a network connection;
   displaying the received online content on a display of the computing device, the displayed online content identifying one or more content fields;
   detecting content received via a user interface of the computing device in the one or more content fields, wherein the content received via the user interface corresponds to one or more types of information;
   determining whether the content received via the user interface comprises protected information based on one or more criteria stored in one or more data stores accessible to the computing device, wherein the one or more criteria comprises a weight of sensitivity corresponding to the one or more types of information, and wherein a measure of protected information is determined based on the weight of sensitivity and an amount of the content received via the user interface;
   determining whether the network connection between the computing device and the server is encrypted; and
   when the network connection is not encrypted displaying a visual indication on the display in response to determining that the measure exceeds a protected information threshold.

2. The method of claim 1, wherein the determining whether the content received via the user interface comprises protected information comprises processing the received online content based on at least one of the one or more criteria.

3. The method of claim 1, wherein displaying the visual indication comprises highlighting on the display a content field of the one or more content fields that contains protected information.

4. The method of claim 1, wherein displaying the visual indication comprises displaying a notice that the content received via the user interface comprises protected information and a security state of the computing device is below a security threshold.

5. The method of claim 4, wherein the notice further comprises one or more user-selectable options, the computing device operative to require selection of one of the one or more user-selectable options before allowing further entry of content into the one or more content fields.

6. The method of claim 1, wherein when the network connection is not encrypted the computing device enters a protected mode in response to determining that the content received via the user interface comprises protected information, the protected mode prohibiting transmission of the protected information from the computing device.

7. The method of claim 1, wherein determining whether the content received via the user interface comprises protected information comprises performing at least one of the following operations: matching the content received via the user interface with at least one of the one or more criteria; matching a content field identifier of the one or more content fields with at least one of the one or more criteria; or, matching characteristics of a form of the content received via the user interface with at least one of the one or more criteria.

8. The method of claim 1, wherein at least one of the data stores or the one or more criteria is specified by instructions received by the computing device from a host server connected to the computing device over a network.

9. A non-transitory computer program product containing instructions executable by a processor of a computing device to render the computing device operative to perform a method for communicating security information, the method comprising:
   receiving online content from a server connected to the computing device via a network connection;
   displaying the received online content on a display of the computing device, the displayed online content identifying one or more content fields;
   detecting content received via a user interface of the computing device in the one or more content fields, wherein the content received via the user interface corresponds to one or more types of information;
   determining whether the content received via the user interface comprises protected information based on one or more criteria stored in one or more data stores accessible to the computing device, wherein the one or more criteria comprises a weight of sensitivity corresponding to the one or more types of information, and wherein a measure of protected information is determined based on the weight of sensitivity and an amount of the content received via the user interface;
   determining whether the network connection between the computing device and the server is encrypted; and
   when the network connection is not encrypted displaying a visual indication on the display in response to determining that the measure exceeds a protected information threshold.

10. A computing device configured to communicate security information, the computing device operative to:
   receive online content from a server connected to the computing device via a network connection;
   display the received online content on a display of the computing device, the displayed online content identifying one or more content fields;
   detect content received via a user interface of the computing device in the one or more content fields, wherein the content received via the user interface corresponds to one or more types of information;
   determine whether the content received via the user interface comprises protected information based on one or more criteria stored in one or more data stores accessible to the computing device, wherein the one or more criteria comprises a weight of sensitivity corresponding to the one or more types of information, and wherein a measure of protected information is determined based on the weight of sensitivity and an amount of the content received via the user interface;

determine whether the network connection between the computing device and the server is encrypted; and when the network connection is not encrypted display a visual indication on the display in response to determining that the measure exceeds a protected information threshold.

11. The computing device of claim 10, wherein the computing device is further operative to process the received online content based on at least one of the one or more criteria to determine whether the content received via the user interface comprises protected information.

12. The computing device of claim 10, wherein the visual indication comprises a content field of the one or more content fields that contains protected information being highlighted on the display.

13. The computing device of claim 10, wherein the visual indication comprises a notice that the content received via the user interface comprises protected information and a security state of the computing device is below a security threshold.

14. The computing device of claim 13, wherein the notice further comprises one or more user-selectable options, the computing device further operative to require selection of one of the one or more user-selectable options before allowing further entry of content into the one or more content fields.

15. The computing device of claim 10, wherein the computing device is further operative to enter a protected mode in response to determining that the content received via the user interface comprises protected information when the network connection is not encrypted, the protected mode rendering the computing device inoperative to transmit the protected information from the computing device.

16. The computing device of claim 10, wherein to determine whether the content received via the user interface comprises protected information the computing device is operative to perform at least one of the following operations: match the content received via the user interface with at least one of the one or more criteria; match a content field identifier of at least one of the one or more content fields with at least one of the one or more criteria; or, match characteristics of a form of the content received via the user interface with at least one of the one or more criteria.

* * * * *